July 31, 1956  C. A. LEE  2,756,648

FLOW CONTROL APPARATUS

Filed Dec. 4, 1952  8 Sheets-Sheet 1

Inventor:
Charles A. Lee
By Soans, Glaister & Anderson

July 31, 1956 C. A. LEE 2,756,648
FLOW CONTROL APPARATUS
Filed Dec. 4, 1952 8 Sheets-Sheet 2

July 31, 1956  C. A. LEE  2,756,648
FLOW CONTROL APPARATUS
Filed Dec. 4, 1952  8 Sheets-Sheet 5

Inventor:
Charles A. Lee
By Soans, Glaister & Anderson
Attys

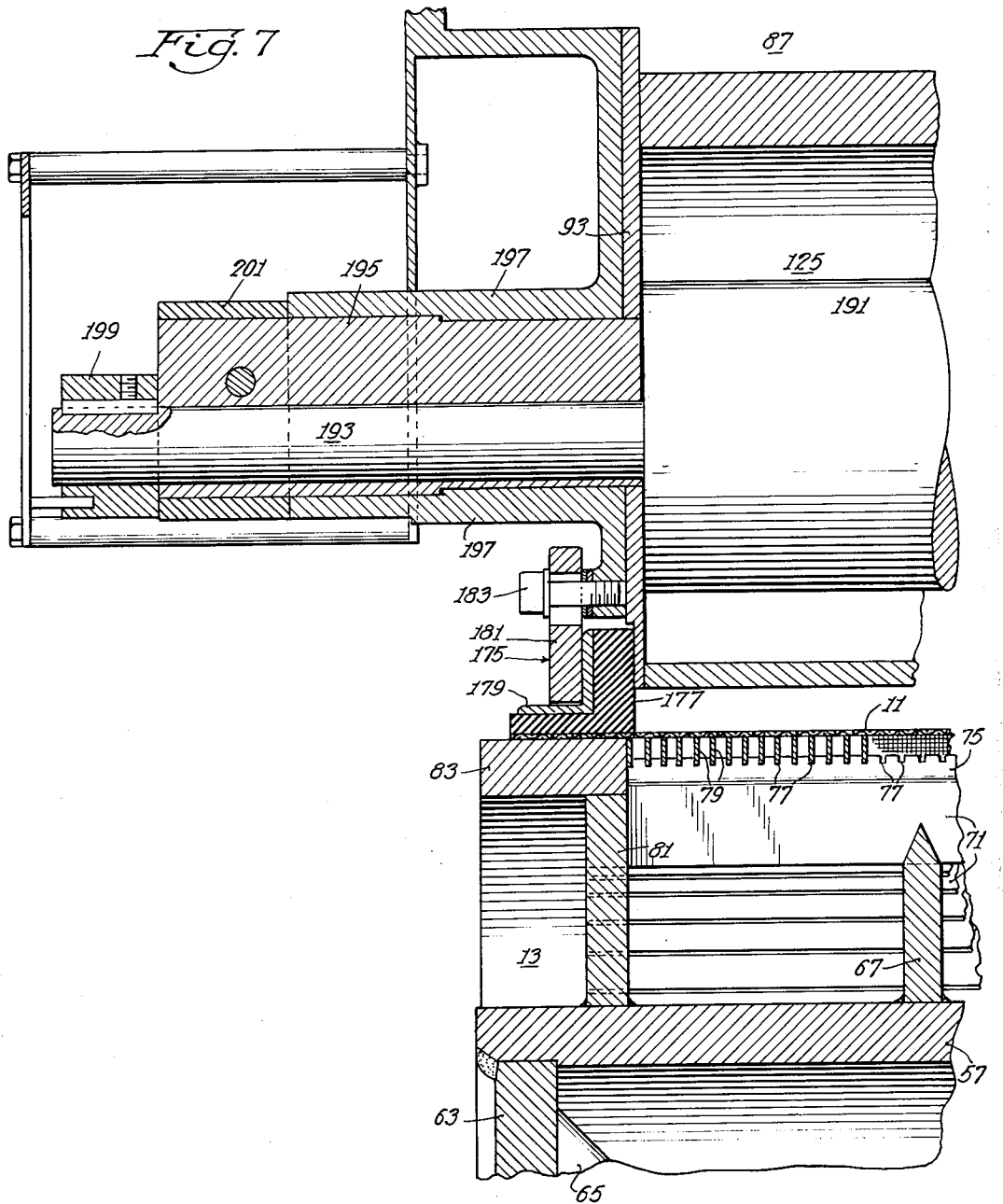

July 31, 1956  C. A. LEE  2,756,648
FLOW CONTROL APPARATUS
Filed Dec. 4, 1952  8 Sheets-Sheet 7
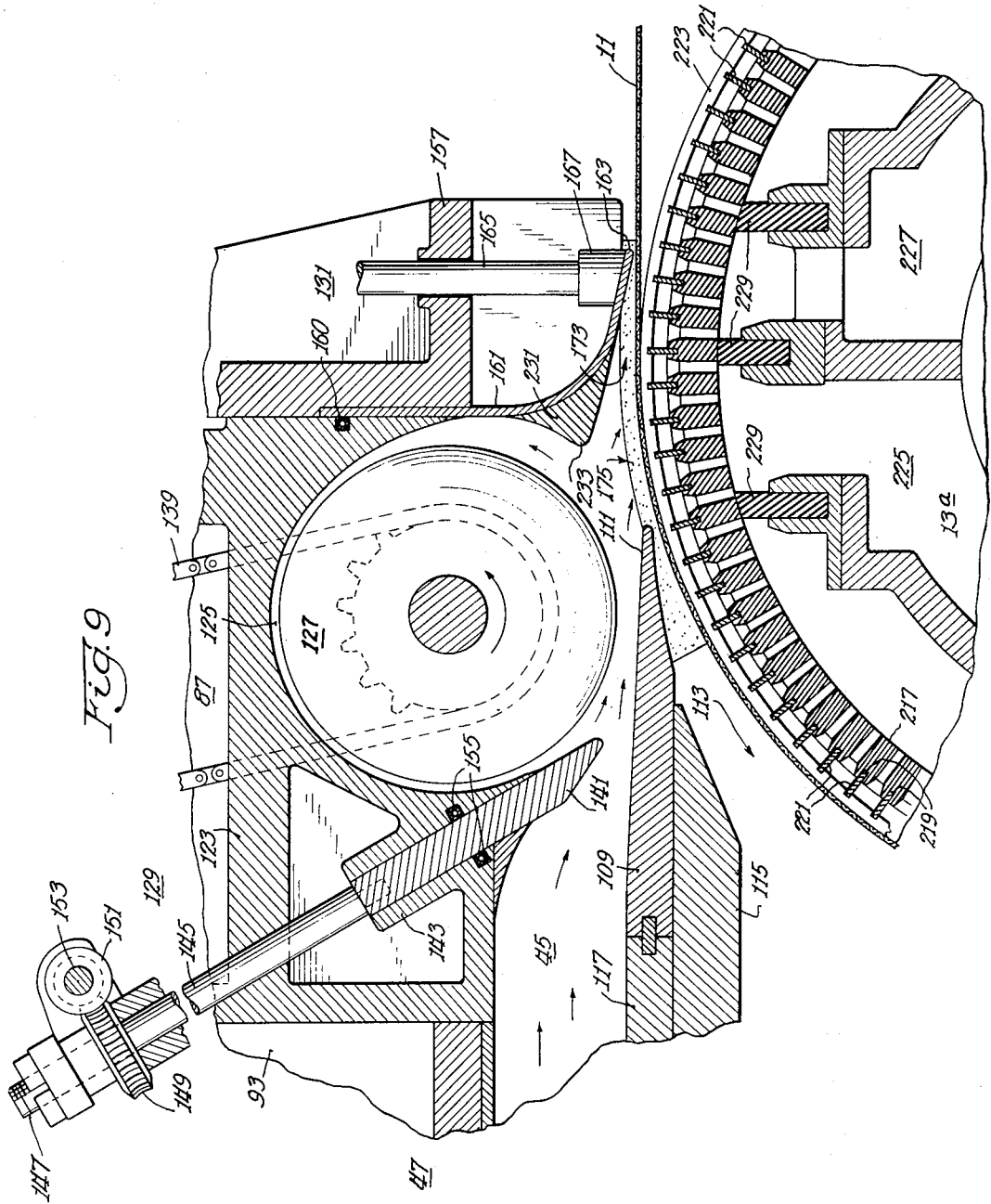
Inventor
Charles A. Lee
By: Soans, Glaister & Anderson
Attys July 31, 1956  C. A. LEE  2,756,648
FLOW CONTROL APPARATUS
Filed Dec. 4, 1952  8 Sheets-Sheet 8
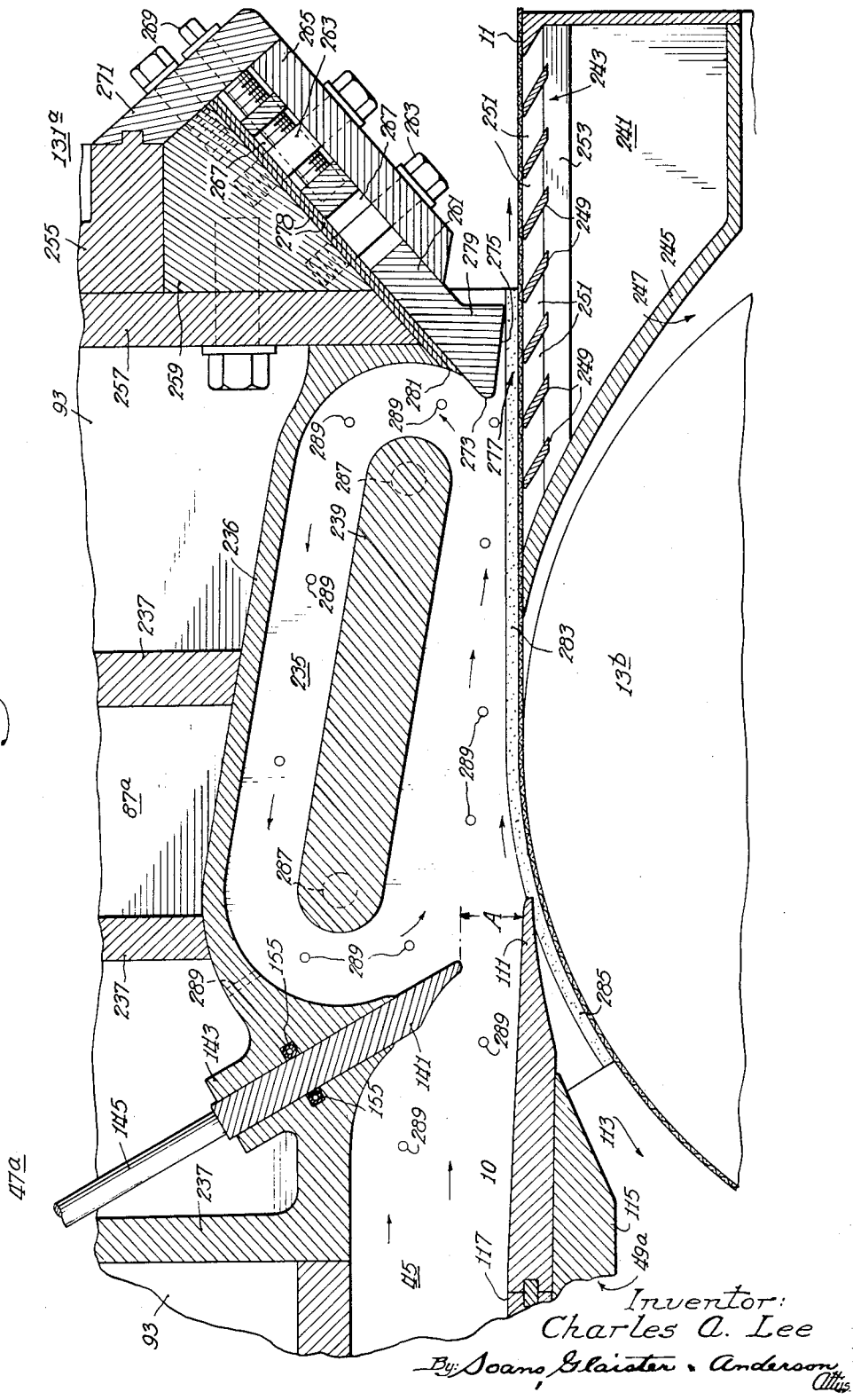
Inventor:
Charles A. Lee
By Soans, Glaister & Anderson
Attys.

2,756,648

FLOW CONTROL APPARATUS

Charles A. Lee, Neenah, Wis., assignor, by mesne assignments, to Kimberly-Clark Corporation, a corporation of Delaware Application December 4, 1952, Serial No. 323,966

14 Claims. (Cl. 92—44)

The present invention relates to the manufacture of felted web and sheet products from fluid suspensions of fibrous materials, and has particular relation to the manufacture of paper on Fourdrinier papermaking machines of the inlet or pressure forming type.

In the operation of inlet or pressure forming type papermaking machines, an aqueous suspension of fiber and such other papermaking materials as may be used, which suspension is commonly designated as "stock," is supplied to a web-forming region through which the Fourdrinier wire is moved. The stock reaches the wire as a relatively high energy, flowing stream which is usually under substantial hydraulic pressure. Examples of these machines are shown in U. S. Patents Nos. 2,060,808; 2,225,435 and 2,308,370.

Prior to the development of the inlet or pressure forming type papermaking machine, it was the general practice in the operation of Fourdrinier papermaking machines to form the mat of fibers of which the paper web is composed by applying to the upper surface of the Fourdrinier wire, as by flowing or spouting thereon, a layer of stock which was then caused or permitted to drain through the wire. The stock so applied to the wire contained the required amount of fiber in an amount of water which was sufficient to produce the proper distribution of the fibers in the web, and sufficient drainage of water was effected during the period of time that the formed web remained on the wire to produce a coherent sheet, capable of being couched off at the downstream end of the wire.

Various mechanisms, including suction boxes, table rolls and water doctors were disposed beneath the wire for increasing the rate of drainage therethrough, and since there was no substantial pressure differential across the wire in the web-forming region along the wire, the speed of operation of these machines was determined primarily by the capacity and effectiveness of the drainage means.

In contrast with this arrangement, in the inlet or pressure forming type machines, the stock, while contained within an enclosed flow conduit, is applied to a restricted area section of the Fourdrinier wire as the wire is moved across the discharge end of that conduit. During the web-forming operation, the stock constitutes a confined, relatively high energy, flowing stream, which is under substantial hydraulic pressure, i. e. the pressure energy component of the stream of stock applied to the wire is usually quite large in relation to the velocity energy component. A large proportion of the water in the stock mixture is thereby forced through the wire in the web-forming region at relatively high velocity, the flow through the wire occurring primarily as a result of the substantial pressure differential existing across the forming wire in the web-forming region. Although the velocity at which the stock is delivered to the web-forming region may be a substantial fraction of the velocity of the wire, the stock is directed toward the wire at such a steep angle that the wire direction component of the stock velocity is small, with respect to the wire velocity. Nevertheless, the usual pressure forming machine is capable of being operated at a much higher speed than the earlier type of Fourdrinier papermaking machines, and these machines have been quite widely used in the papermaking industry, especially in the manufacture of sheets having a basis weight less than about 15–20 pounds per standard ream of 480 sheets 24 by 36 inches.

However, such pressure forming type machines possess certain inherent operational limitations or deficiencies. Particularly, it appears impractical to operate this type machine at speeds in excess of from about 1500 to 2000 feet per minute. When an attempt is made to operate such a machine at speeds in excess of this range, cyclic or intermittent conditions of flow instability result, the effect being somewhat similar to that which was encountered when attempts were first made to operate aircraft at supersonic speeds. In addition to these operational difficulties, product deficiencies were also found to exist as the operating speeds of pressure forming machines were increased. Of especial importance in this connection, it was found that increased operating speeds tend to increase the ratio of the machine direction strength to the cross machine direction strength of the sheet, the ratio becoming excessively large at the upper end of the permissive operating range of pressure type machines.

In my prior applications, Ser. Nos. 121,525; 196,893; and 242,519, which were filed on October 15, 1949; November 21, 1950; and August 18, 1951, respectively, and of which this application is a continuation-in-part, certain of these conditions and difficulties are discussed. Also, these prior applications disclose arrangements for overcoming various of the flow instabilities previously referred to, and set forth in some detail certain operational principles applicable generally to pressure forming and other machines. More specifically, applications Ser. Nos. 196,893 and 242,519 disclose certain basic principles applicable to the control and adjustment of the pressure and velocity relationships existing within the web-forming region of pressure forming papermaking machines and other apparatus. The applications further disclose and teach how these principles may be embodied in pressure-forming papermaking machines and other apparatus, operable to accomplish the manufacture of fibrous webs from fluid suspensions, to permit much higher speeds of operation and much better control of the character and arrangement of the constituent fibers of the web than has heretofore been possible.

As previously indicated, the present invention is directed to the same general problem as my said prior applications, i. e. the provision of improved apparatus and methods for the manufacture of felted, fibrous webs from fluid suspensions of fibrous materials, and especially the provision of improved papermaking apparatus of the pressure forming type. Further, the realization of all of the possible advantages of the present invention involves the use of certain of the principles and structural arrangements disclosed in my said prior applications for accomplishing the control of the pressure and velocity relationships existing within the web-forming region.

The present invention extends the disclosure of my said prior applications and shows that control and adjustment of the pressure and velocity relationships existing in the web-forming region is a much more comprehensive tool in the manufacture of formed webs than has heretofore been appreciated. Specifically, as will be pointed out hereinafter, the present invention shows that control and adjustment of the pressure and velocity relationships existing in the web-forming region, and particularly the velocity relationships can be used to control and adjust the machine direction to the cross machine direction strength ratio of the sheet which is being formed.

The present invention includes the discovery of additional procedures and methods for controlling the pressure and velocity relationships existing in the web-forming region. Of particular importance in this regard is the discovery that effective control of the cross-direction to machine direction strength ratio can be effected by control and adjustment of the relative relation of the velocity and pressure energy components in the flowing stream of stock which is delivered to the web-forming region.

The invention also includes the further important discovery that the operation of pressure forming equipment is not limited, as has heretofore been thought, to the manufacture of sheets having a basis weight which is less than about 20 pounds for 480 sheets 24 by 36 inches, but that it is possible to manufacture sheets of much heavier basis weight under pressure forming conditions, or by the use of a combination of pressure forming and other procedures.

These and other features of the invention will be made more apparent in the following description and accompanying drawings of certain preferred embodiments of the invention as applied particularly to pressure forming or inlet type Fourdrinier papermaking machines.

In the drawings:

Figure 7 is a sectional view on the line 7—7 of Figure 5;

Figure 9 is also a sectional view, generally similar to Figures 3 and 4, illustrating certain of the features of another flow control mechanism in accordance with the invention. This view also illustrates a modified slice structure and a modified open breast roll structure;

Figure 10 is a cross-sectional view, generally similar to Figures 3 and 4, illustrating another flow control mechanism in accordance with the invention, this structure being particularly adapted to the manufacture of sheets of heavier basis weights.

Figure 1:
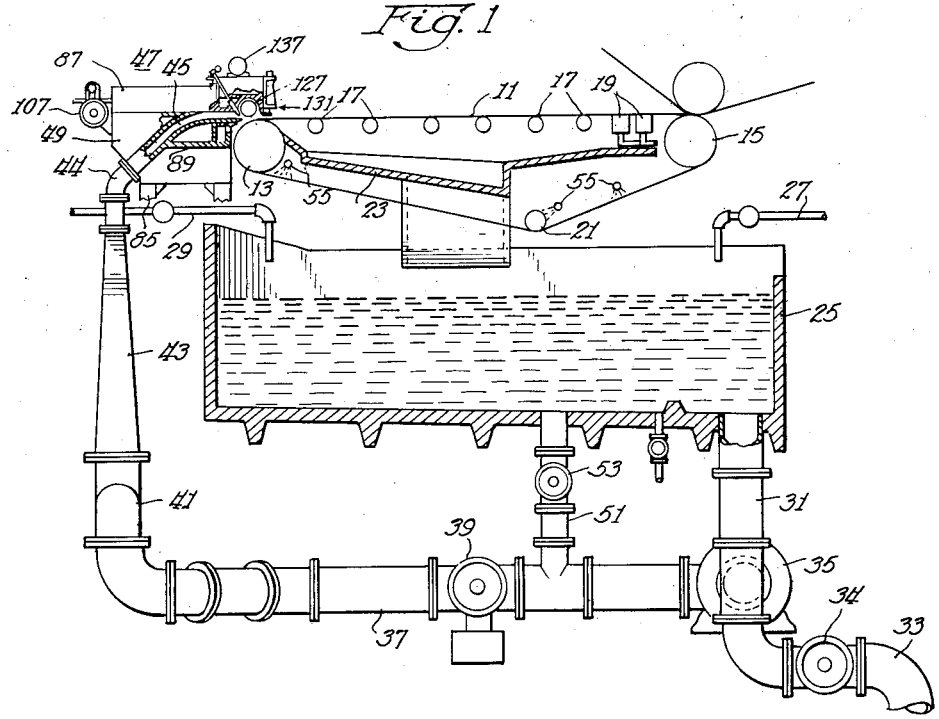
Figure 1 is a schematic view, partially in vertical section and partially in side elevation, of the wet end of a Fourdrinier pressure inlet type papermaking machine embodying certain of the features of the invention, and certain accessory equipment.

In my prior application, Ser. No. 196,893, it has been shown that materially improved web formation, together with substantially increased operational speeds can be attained in apparatus wherein fibrous webs are being formed by the use of fluid suspensions of fibrous material on a moving wire or other web-forming member by establishing certain pressure and velocity relationships within the web forming region. Also, in my said prior application, Ser. No. 196,893, there has been disclosed certain methods and apparatus for accomplishing control and adjustment of these relationships. In general, the specific embodiments of the invention disclosed in that application accomplish the invention by the controlled addition to the fluid suspension of fibrous material which contacts the forming member of substantial amounts of mechanical energy.

In my prior application, Ser. No. 242,519, there are disclosed other means of attaining, within certain limits, the control and adjustment of the pressure and velocity relationships in the web forming operations without the addition of mechanical energy to the flowing stream being delivered to the web-forming region. More particularly, in application Ser. No. 242,519, it is shown that the desired control and adjustment of the pressure and velocity relationships can be effected by the provision of flow passageways of such design that the flowing stream of fluid in the web-forming region reaches the web forming member under conditions of curvilinear or non-rectilinear flow, and preferably under conditions of curvilinear flow through an expanding flow path. The arrangements disclosed in both applications are effective to produce increasing pressure along any stream line above the web-forming member, and a pressure differential across the web-forming member within the web-forming region which increases in the direction of movement of that member.

The present invention, in certain of its aspects, involves an extension of the principles of pressure and velocity control disclosed in my said, two prior applications. Like the disclosure of those applications, it contemplates the control and adjustment of the pressure and velocity relationships within the web-forming region; it includes, however, important extensions of my prior applications, both in regard to the theoretical aspects and the practical operating characteristics of the procedures and apparatus disclosed in those applications. In addition, the present invention includes other means of accomplishing the teachings of certain of those applications.

In this regard, it has been suggested in my prior applications that a preferred web-forming condition exists when the velocity at which the stock is delivered to the wire or other web-forming member, is substantially equal to the wire velocity throughout the web-forming region and when the pressure differential across the wire increases in the web-forming region in the direction of movement of that member. While these conditions make possible the high speed manufacture of a sheet which is essentially "square," i. e. of equal strength in both directions, and with optimum fiber distribution, a "square" sheet is not always desired, and this practical consideration of the papermaking art is herein given full consideration.

As will hereinafter appear, the present invention contemplates the delivery of a flowing stream of stock to the web-forming region under such conditions that this stream constitutes a high energy jet. In contrast with certain of the arrangements heretofore proposed, the velocity energy component of this jet is substantially higher, as compared with the pressure energy component of the jet, than in the flowing stream of stock delivered to pressure forming type units of the type disclosed in the patents referred to in the foregoing, or in certain of the arrangements of my prior applications. The invention accomplishes a controlled degeneration of a portion of this jet in the web-forming region, this degeneration being utilized to convert part of the velocity energy in the jet into pressure energy, thereby to control and determine the pressure differential existing across the web-forming member in the web-forming region. A number of structural arrangements adapted to effect this controlled degeneration of the jet will be disclosed, as will various procedures for effecting control of the degeneration.

Certain of the principles and arrangements of the present invention are readily applicable to the older types of existing pressure forming machines, and when so applied, make possible substantial improvement in the characteristics of the product being made, and substantial increase in the possible operating speeds of the machines, both under operating conditions which are substantially more flexible and readily controlled than any arrangement heretofore developed.

The diagrammatic view, Figure 1, illustrates the general structure and arrangement of a pressure-forming or inlet type Fourdrinier papermaking machine of the general character to which the present invention has particular application. As there shown, the Fourdrinier wire 11 is supported upon a breast roll 13 and a couch roll 15, and is adapted to pass over a plurality of spaced table rolls 17 and suction boxes 19. The wire 11 is tensioned by additional guide or tensioning means, as illustrated at 21.

A tray 23, which is adapted to collect the white water, i. e. the liquid which drains through the wire during the web-forming operation, is disposed within the upper and lower reaches of the wire 11, as illustrated, and this tray is arranged to discharge into a mixing tank 25, which is normally maintained about three-fourths filled. Fresh water for make-up purposes may be added to the mixing tank 25 through the pipe 27, and additional stock, as is necessary to maintain the proper consistency or fiber concentration in the fluid suspension or stock being delivered to the web-forming region, is added through a second inlet pipe 29.

The bottom of the mixing tank 25 is inclined, as shown, and a main flow line 31 connects to the tank at the lower end thereof. The main flow line 31 includes a branch extension 33 having a valve 34 therein for use in draining the mixing tank, and the main flow line 31 also connects with the inflow side of a stock or fan pump 35, which is the principal means relied upon to deliver stock to the web-forming region of the machine.

The outlet of the fan pump 35 is connected to the inlet structure of the machine by suitable piping, indicated generally at 37. Included in this piping is an automatically operable pressure regulating valve 39, a transition section 41, which converts the circular cross sectional stream delivered by the fan pump 35 and piping 37 to a stream of rectangular outline, and a flow spreader 43, which may, for example, be similar to the flow spreader disclosed in my prior application, Serial No. 119,140. The flow spreader 43 accomplishes the function of converting the uniformly dimensioned stream delivered by the transition section 41 into a relatively shallow stream of rectangular cross section which desirably has a transverse width substantially equal to the cross-machine width of the web-forming region of the machine.

The outlet end of the flow spreader 43 is connected to the web-forming region of the machine by an angle connection 44 and a conduit 45, which is provided in the lower or stationary portion 49 of the flow control unit 47. The flow passageways within the angle connection 44 and the conduit 45 are each rectangular in cross-section and of the same dimensions as the outlet end of the flow spreader 43. The piping 37 also includes a by-pass line 51 which connects the outlet side of the fan pump 35, upstream of the pressure regulating valve 39, with the mixing tank 25, as shown. The by-pass line includes a shut-off valve 53. Suitable showers or sprays, indicated generally at 55, are provided for effecting continuous cleaning of the rolls and wire, in accordance with usual papermaking practices.

Figure 2:
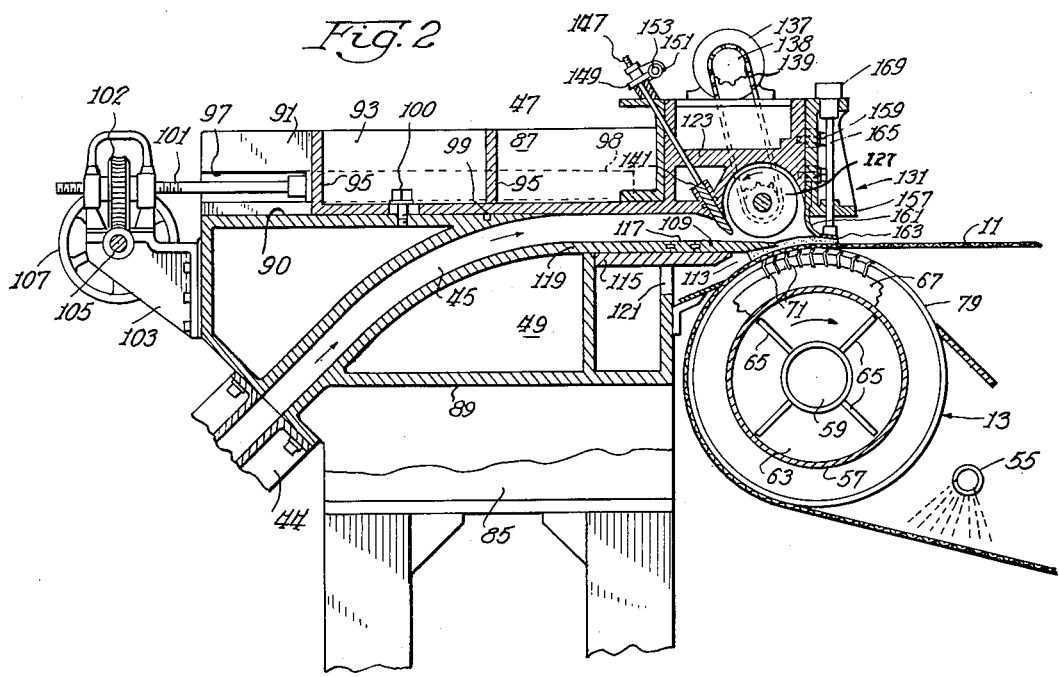
Figure 2 is an enlarged, vertical, cross-sectional view of the machine illustrated in Figure 1, this view showing certain of the details and features of the web-forming and flow control mechanisms in accordance with the invention, which is embodied in that machine.

The particular breast roll constituting a part of the apparatus illustrated in Figures 1 and 2 is of the open-surfaced type and is illustrated in some detail in Figures 2, 3, 4 and 7. As there shown, the roll 13 comprises a cylindrical inner shell 57 which may be of bronze or other corrosion resistant material, and which is supported for rotation by means of a pair of shaft sections 59, each of which is mechanically connected to one end of the shell by a suitable header unit. As shown in Figures 2 and 7, each of the header units includes a plate section 63, the periphery of which is welded or otherwise attached to one end of the shell in water-tight relationship, together with a plurality of radially-extending, symmetrically-spaced bracing members 65, which are welded to the inner end portions of the two shaft units 59.

At spaced intervals along the shell 57, the roll 13 is provided with a plurality of outwardly-projecting ring units, 67. The rings 67 are integrally attached to the shell 57 and are provided with spaced notches 69 (Figure 3) which support a plurality of elongated bar or vane members 71. These vane members 71 are of generally curved cross section as shown particularly in Figure 3, and extend longitudinally of the roll surface with the longitudinal axes thereof substantially parallel to the axis of rotation of the roll.

The spaced vane members 71 are used to receive and to hold temporarily the liquid which is forced through the wire and the adjacent underlying surface of the roll during the web-forming operation. Each of the vanes 71, as shown particularly in Figure 3, includes a base or root portion which is rectangular in cross section, and which is adapted to fit within the vane-supporting notches 69 in the ring units 67. The slots 69 are so arranged that the root portion of each vane is disposed at an angle of about 15° to the radius which intersects the base of that portion. This angle is illustrated at $\alpha$ in Figure 3, in which figure the radius is indicated by the line 73.

Figure 3:
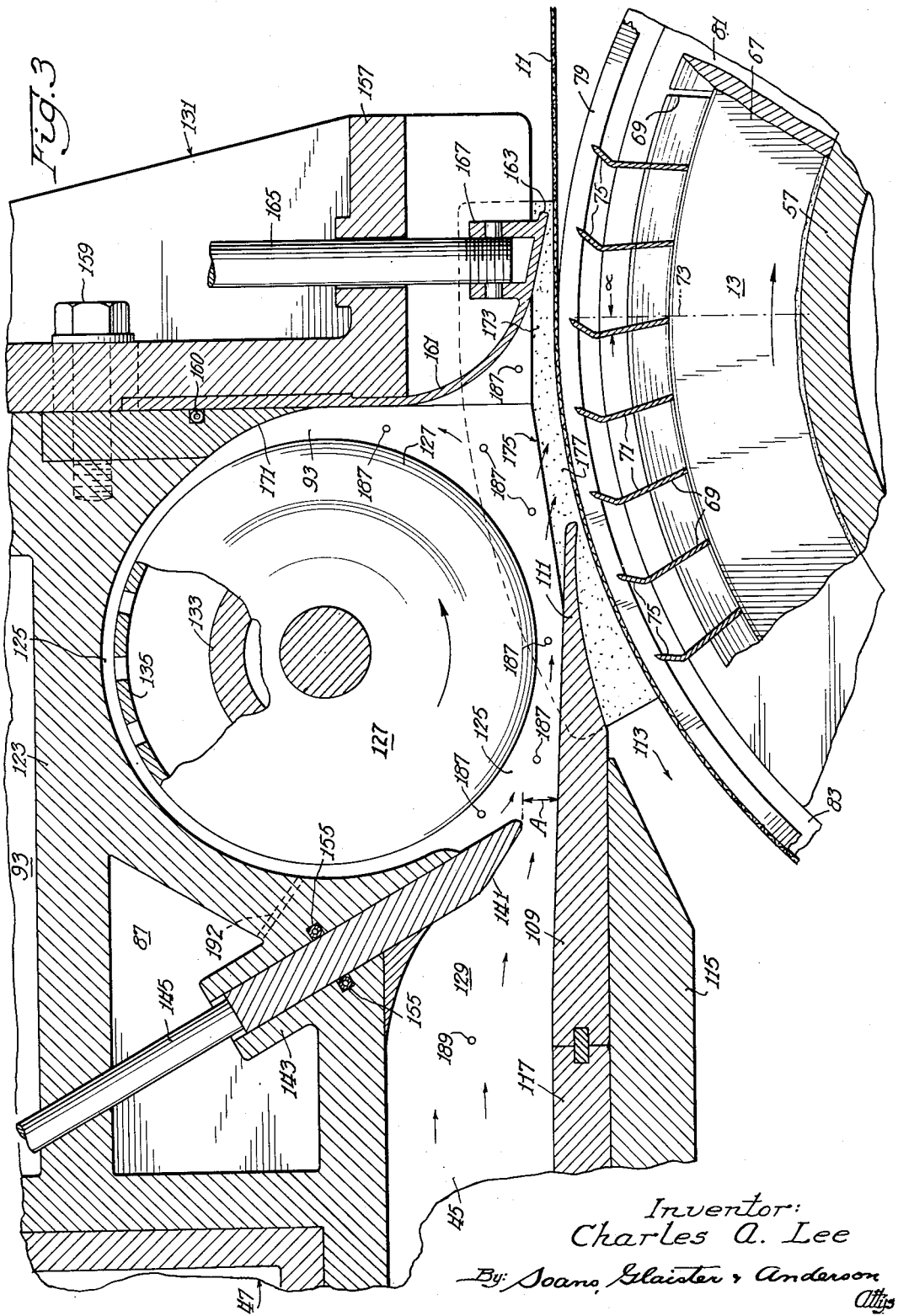
Figure 3 is an enlarged, fragmentary, sectional view of the web-forming section of the machine illustrated in Figures 1 and 2.

The remaining outer portion 75 of each of the vanes 71 is inclined forwardly, in the direction of roll movement, at an angle of about 120° with reference to the associated root section. The outer end portion 75 of each of the vane sections is tapered to a sharp edge with the result that each vane is, in effect, of curved cross-sectional outline. A radius drawn through the forward edge of the root section will substantially intersect the sharp edge of the outer portion 75, as shown in Figure 3.

The outer edge portion 75 of each of the vane units 71 is also notched, as shown particularly at 77 in Figure 7, and during the manufacture of the roll, an edgewise disposed ribbon 79 of bronze or other corrosion resistant material is wound into these slots 77 so as to provide a helical coil of closely spaced turns which extend along the periphery of the roll 13. This is shown particularly in Figures 3 and 7, and it will be noted that the helical ribbon 79 projects a substantial distance above the outer edges of the vanes 71. This arrangement permits free circulation of liquid between the cells or cavities formed in the roll periphery by the spaced vanes 71, and it also minimizes vane "shadows" in the formed web.

In roll constructions of the general type illustrated, the vanes 71 are preferably spaced within the range of from about ¾ to 1½ inches along the roll periphery, and the turns of the edgewise-wound wire ribbon 79 which defines the outer surface of the breast roll should be spaced sufficiently close together to prevent appreciable deformation of the forming wire during the operation of the machine. In a practical embodiment of the invention, where the breast roll had an overall diameter of approximately 24 inches, the helical ribbon winding 79 was wound at a pitch of 5 turns to the inch, and constituted a strip of bronze ribbon having a thickness of .035 inch, and a maximum cross-sectional dimension of .250 inch. In this same construction, the edges of the vanes were about .15 inch below the outer peripheral edge of the ribbon. A coarse mesh woven wire covering, such as a 12–14 mesh screen, (not shown) may be applied over the ribbon winding, if desired.

As shown particularly in Figure 7, the vane support rings 81 at the two ends of the roll are of a somewhat greater height than the intermediate ring support members 67, and are adapted to co-act with locking rings 83 which engage notches in the end sections of the vanes, so as to lock the vanes in position. The particular arrangement of the vane elements 71 and the ribbon support 79 for the forming wire present a minimum of resistance to the flow of fluid through the wire into the breast roll. At the same time, the vanes are operable to retain the liquid which is received therein during the period in which the forming wire moves out of the web-forming region.

Referring to Figure 2, it will be seen that the flow control unit 47 includes the lower or stationary section 49 which is integrally attached to the main frame 85 of the machine, and an upper or adjustable section 87, which is supported on the stationary section 49. The lower section 49 includes suitable plate and structural elements which define a frame portion 89 having a flat upper surface 90, a pair of upwardly-extending sides 91, and the walls of the closed conduit 45 through which the stock is conducted to the other elements of the flow control means.

The upper section 87 of the flow control unit is likewise of fabricated construction, and includes oppositely arranged side walls 93 which are connected together by suitable transversely-extending structural members 95 to define a generally horizontally disposed box structure, which is supported upon the flat upper surface 90 of the frame portion 89 of the stationary section 49 so as to be movable toward and away from the vertical center line of the breast roll 13.

To facilitate the accomplishing of this movement, the side walls 91 of the stationary section are provided with guideways 97 adapted to receive and to coact with suitable guide members 98 constituting an integral part of the side walls 93 of the adjustable section 87. The coacting guides 98 and guideways 97 serve the additional function of preventing the hydraulic pressure which is developed within the flow passageways of the flow control unit 47 from displacing the adjustable section 87 relative to the lower stationary section 49. To further aid in accomplishing this, it is generally desirable that the guides and guideways shall be constructed to fairly close tolerances. It may also be found desirable to include seals, as for example, the O-ring type seal illustrated at 99, between the engaging surfaces of the upper and lower sections 87 and 49 to minimize the possibility of fluid leakage in the operation of the apparatus. Locking screws, as illustrated at 100, may also be used to aid in holding the sections in proper adjustment.

Two or more horizontally-extending, adjusting screws 101 are affixed to the adjustable section 87 at spaced intervals therealong, and these screws engage internally threaded gear wheels 102, which are supported upon suitable brackets 103, attached to the frame portion 89 of the stationary section 49. The gear wheel units 102 are rotated simultaneously by worm gear sections keyed to a shaft 105, which is journalled on the brackets 103, and a hand wheel 107 is provided for rotating the shaft 105. By this means, it is possible to move the entire adjustable section 87 of the flow control unit 47 toward or away from the vertical center line of the breast roll and thereby vary the dimensions and relative location of the web-forming region on the wire. The plane of separation between the upper and lower sections of the flow control unit, which plane is coincident with the surface 90, normally extends substantially parallel to the surface of the horizontal position of the forming wire 11.

The flow conduit 45 through which the stock is conducted from the discharge end of the angle connection 44 leading from the discharge end of the flow spreader is rectangular in cross section and may have the same cross-sectional area, and dimensions as that end of the flow spreader. In the structure illustrated in Figures 2 and 3, the lower surface of the flow conduit 45 in the region adjacent the web-forming region is defined by an apron plate 109 which extends transversely across the full width of the machine. The lower surface of the outer or lip portion 111 of the apron plate is cut way, as shown, and desirably this surface is curved so as to provide with the adjacent surface of the wire 11, which is supported on the breast roll 13, a passageway 113 which is of increasing cross-sectional area in the direction opposite to the direction of movement of the wire. The apron plate is supported upon an underlying support plate 115 integral with the frame portion by means of suitable screw fastenings, not shown.

In order that the position of the apron plate 109 may be adjusted horizontally, the structure includes a removable spacer bar 117, which is adapted to be interposed between the apron plate 109 and the plate member 119, which constitutes the main defining element for the lower surface of the flow delivery conduit 45. It will be apparent that by the use of spacer bars of varying width, it is possible to readily adjust the position of the apron plate 109 relative to the center line of the breast roll, and thereby vary the horizontal dimension of the web-forming region.

The outer edge of the plate 115 upon which the apron plate 109 is supported is also cut away in order to facilitate free backward flow of stock through the passageway 113 during the web-forming operation. Also, to aid in conducting away this flow from the web-forming region, the main frame may be provided with openings as indicated at 121 in Figure 2.

The flow control unit 47 is operable to direct a flowing stream of stock onto and through the wire as the wire is moved through the web-forming region at the discharge side of that unit. The flow control unit includes transversely extending structural elements 123, integrally attached to the side walls 93, which define the walls of a generally cylindrical, flow control chamber 125, and a cylindrical flow control member 127 disposed within the flow control chamber 125 in a generally symmetrical relation thereto. The unit also includes an adjustable throttling means, indicated generally at 129, which is positioned at the inflow side of the main flow chamber 125, and an adjustable slice mechanism 131, which defines the downstream edge of the pressure forming zone on the wire.

In the particular apparatus illustrated in Figures 2 and 3, the flow control member 127 comprises a perforated cylinder which extends the full length of the chamber 125 and is supported for free rotation therein by suitable bearings, not shown. The peripheral diameter of the flow control roll 127 is somewhat less than the diameter of the flow control chamber 125, and the roll 127 is connected to a drive means in order that it may be driven at predetermined speed during the operation of the apparatus. The illustrated flow control roll includes an inner solid shell 133 and an outer shell 135, which is perforated, the perforations being regularly spaced over the roll surface and approximately 40 percent of that surface being open as a result of the perforations.

The roll drive means, which may include a motor 137, sprockets 138 and a drive chain 139, should be capable of driving the roll at relatively high speed. For example, in a structure using a flow control roll approximately 8 inches in diameter within a flow control chamber 9 inches in diameter, the drive means should be capable of driving this roll at a speed within the range of 400–600 R. P. M. during normal operating conditions of the machine. This speed, it should be noted, is at least several times the speed of rotation of the distributor or flow evening rolls heretofore used in pressure type forming units. Lower roll speeds will increase the rate at which velocity energy is converted to pressure energy, and generally, this is not a preferred method of operating.

The inflow throttling mechanism 129 embodied in the apparatus is illustrated particularly in Figures 2 and 3. As there shown, it includes a bar or vane member 141, which extends completely across the width of the machine, and which is arranged to effect even and uniform throttling of the flowing stream of stock which is being delivered to the flow control unit through the flow conduit 45. The throttling member 141 is supported for limited movement toward and away from the apron plate 109, which defines the adjacent lower surface of the delivery conduit 45, by means of suitable guide means 143 integrally attached to the transversely extending frame structure 123 of the flow control unit.

Movement of the throttling member 141 and accurate positioning of that member relative to the apron plate 109 is accomplished by means of a plurality of spaced rods 145, each of which is connected at one end to the throttling member 141 and is provided with a threaded end portion 147 at its other end. The threaded end portions 147 engage suitable internally threaded gear wheels 149, which are supported on the frame of the upper section 87 of the flow control unit 47. These gear units 149 are rotated in unison by co-acting worm units 151 supported upon and keyed to a suitable actuating shaft 153. The arrangement permits the throttling member 141 to be moved so as to vary and adjust the height of the opening (the dimension A in Figure 3), through which stock is admitted to the flow control chamber 125.

To prevent leakage along the sides of the throttling member 141, it is desirable to include sealing means, such as the resilient sealing tubes 155, located intermediate the throttling member and the sides of the guide support 143 therefor. The edges of the support members are desirably curved to conform generally to the outline of the stream lines existing in the flow pattern within the apparatus during operation.

It is desirable that the breast roll 13 be supported in such manner that its position relative to the flow control unit 47 can be accurately adjusted—this in conjunction with the adjustable support for the apron plate 109 and the permissive fore and aft adjustment of the upper section 87 of the flow control unit 47, making possible very close control and adjustment of the dimensions of the web-forming region and the flow passageways adjacent that region. Adjustment of the position of the breast roll 13 is most easily accomplished by the use of an automatically operable adjustable roll support of a hydraulic or other type. Such mechanisms are commercially available and will not be described in detail.

The slice or discharge lip structure 131 is supported on the downstream end of the frame of the upper section 87 of the flow control unit, as illustrated generally in Figures 2 and 3. Essentially the slice structure 131 includes a transverse, beam support member 157, which is generally channel-shaped in outline, and serves as the main support for the other elements of the structure. The beam member 157 extends completely across the machine and is attached to the frame 123 of the flow control unit by suitable screw fastenings 159 which permit limited vertical movement of the slice structure. A tube or O-ring type seal 160 prevents leakage between the engaging surfaces of the beam 157 and the frame structure 123.

The slice structure 131 serves as the downstream closure for the flow control chamber 125, and in order to accomplish that function, it includes a transversely-extending, flexible plate section 161, which is supported on the channel-shaped beam member 157, as shown in Figure 3. It is intended that the lower end portion of the plate member 161 may be warped during operation of the machine in order to effect both general and local adjustment of the spacing between the downstream edge or lip 163 of the slice plate and the wire.

To accomplish the adjustment, the lip portion of the slice plate 161 is engaged by a series of spaced-apart support rods 165 which extend through the beam 157 and which are fastened to the plate 161 by suitable sockets and pins 167, as illustrated. The upper end of each of the slice adjusting rods 165 is connected to a threaded adjusting unit 169, which can be rotated to effect the desired adjustment. The rotatable adjustment units 169 are supported upon the upper web of the beam 157. The adjacent defining surface of the main flow control chamber 125 is desirably faired into the cooperating surface of the slice plate 161, as illustrated at 171, in order to minimize the likelihood of localized turbulence.

The slice plate 161 is curved in generally cylindrical form and provides with the adjacent surface of the wire 11, a flow passageway 173 of substantial length and constantly decreasing cross-sectional area in the direction of movement of the wire, and the formed web. This arrangement, in combination with the available adjustment of the downstream edge or lip 163 of the slice plate 161, makes possible accurate control of the amount of stock which is discharged from the flow control unit on top of the formed web and is of important value in assuring satisfactory operation of the mechanism.

The two sides of the flow control chamber 125 are closed by the end walls 93 of the flow control unit and suitable sealing units 175, which are adapted to ride on the wire during the machine operation. The sealing units 175 may be similar to the sealing units shown in Figs. 5 and 7, comprising L-shaped sections 177 of rubber or other resilient material which is backed by a rigid metal angle 179, the entire structure being adjustably held in position by a support 181, which is bolted to the side of the flow control unit by suitable bolts 183. The support 181 includes spaced adjusting screws 185, which bear against the angle 179 to effect accurate adjustment of the seal.

In the operation of apparatus of the type illustrated in Figures 2 and 3, the stock is supplied to the flow control chamber as a high energy, flowing stream having substantial velocity and pressure energy components. This is accomplished by introducing the stock into the flow control chamber as a high energy jet. For most efficient operation it is quite important that the axis of this stream or jet shall extend substantially parallel to the plane of the wire in the web-forming region.

Within the flow control chamber, the jet, which is generally rectangular in cross-sectional outline, is brought into contact with the outer periphery of a second stream of stock which is flowing in a generally vorticular path. The velocity at the periphery of this vorticularly flowing stream is less than the velocity of the jet in the region of contact, and as a result, the jet intermixes with the vorticular stream in a manner which causes progressive degeneration of the jet, with accompanying conversion of the velocity energy component of the degenerating portion of the jet into pressure energy, together with the creation of a fine scale turbulence condition. The rate of degeneration of the jet is so controlled that at least the core of the jet persists for a distance which is not less than about fifteen times the cross-sectional width or vertical height of the original jet, and the dimensions of the flow control passageways within the flow control unit are such that the jet persists substantially intact over at least a substantial part of the web-forming region. The jet should be established quite close to the web-forming region, and should be fully formed at the upstream edge of that region.

The vorticular flow which is used to effect controlled degeneration of the jet is produced by recirculation of a quantity of the stock within the flow control chamber, and the velocity of the recirculating, vorticular stream is controlled and determined by either the positioning or the speed of rotation of the cylindrical flow control member, which is located within the flow control chamber, or by a combination thereof.

In this connection, it should be understood that the concept of utilizing the controlled degeneration of a portion of a jet, or a jet-like stream, to determine and control the pressure relationships existing in a web-forming region is not limited to the disclosure of this application. In the operation of the structures disclosed in my prior applications, Ser. No. 196,893 and Ser. No. 242,519, controlled degeneration of the rectangular cross section, flowing stream of stock which is supplied to the web-forming region, which stream of stock under certain operating conditions will constitute a jet, is inherent, and studies of the operation of this prior equipment have shown that jet or stream degeneration and transfer of velocity energy to pressure energy does occur. The obtaining of controlled degeneration of a jet, in accordance with the procedures and apparatus disclosed herein, which involve the intermixing of the upper layer of the jet with a vorticular stream, constitutes merely an unusually convenient and highly satisfactory way of accomplishing the desired result.

It will also be appreciated that means other than the throttling mechanism herein disclosed can be employed in the production of the high energy jet. For example, a flow channel of suitable dimensions might be employed, although this arrangement has the disadvantage of inducing rather serious head and energy losses in the flowing stream, especially if the channel should be of substantial length.

One of the most important discoveries constituting a part of the present invention is the discovery that the ratio of the machine direction strength to the cross machine direction strength of the formed web can be varied by adjustment and control of the velocity of the jet which is admitted to the flow control chamber during the operation of the apparatus. In my prior applications, it has been pointed out that improved results can be obtained in pressure forming type papermaking equipment when the stock which reaches the upstream edge of the web-forming region is at minimum pressure and a velocity which is substantially equal to the velocity of the wire, and various mechanisms have been disclosed in those applications for accomplishing this condition. One of these improved results is the attainment of a sheet having essentially "square" characteristics, i. e. a machine direction strength to cross machine direction strength ratio of approximately unity.

A "square" sheet is not always desired and, as previously stated, the present invention includes the discovery that by varying the velocity of the jet which is admitted to the flow control chamber, it is possible to vary, within quite wide limits, the ratio of the machine direction to cross direction strength of the formed web. To illustrate the importance of this feature of the invention, in the normal operation of papermaking machines of the general type shown in Patent No. 2,225,435, in the manufacture of a tissue having a weight within the range of from about 7 to 10 lbs., from a furnish consisting of 25% bleached sulphite and 75% bleached sulfate, at speeds within the range of from about 1200 to 1500 feet per minute, the stock having a consistency of from .20 to .35%, the ratio of the machine direction strength to cross machine direction strength will be within the range of from 4.0–5.5 to 1, and as the speed is increased, the ratio will increase rapidly.

there may be conditions wherein it is not desirable to inapproximately 7.5 lbs. per standard ream, from a similar furnish consisting of 25% bleached sulphite, 75% bleached sulphate, at manufacturing or wire speed of 1500 feet per minute, and a stock consistency of .18, by the use of apparatus of the type illustrated in Figures 2 and 3, the equipment was adjusted to provide a jet having a vertical height at the throttling orifice, the dimension A of Figure 3, of ¾ of an inch, and a forming length of approximately 4½ inches, the vertical height of the approach conduit 45 being 3 inches. With these dimensions and with the operating conditions stabilized at the values stated, the velocity of the jet was varied over rather wide limits. When the jet velocity equaled approximately 880 feet per minute, the machine direction to cross machine direction ratio was found to average 4.26 in a series of tests. Increasing the jet velocity to 1075 feet per minute reduced the machine direction to cross machine direction strength ratio to 2.58, and the projection of additional points indicated that a ratio of approximately unity would result when the jet velocity equaled the wire velocity. The directional effect produced by these velocity variations is of particular importance at forming speeds in excess of 1500 feet per minute. With an approach conduit 3 inches in depth, it has been found that the dimension A may vary from ¼ inch to 2½ inches, openings of from ⁷⁄₁₆ inch to 1⅛ inches being found especially useful.

As previously stated, the axis of the jet should extend substantially parallel to the surface of the web-forming member in the web-forming region, or tangent to that surface, if the surface is curved. In general, this relationship is fairly critical, and the axis of the jet for best results should not vary more than approximately 10° from the stated direction.

At the same time, the controlled resistance which is imposed in the jet path by the vorticular stream which is caused to circulate around the flow control member makes it possible to deliver the stock to the web-forming region at optimum pressure as well as at a velocity which is sufficiently close to the velocity of the wire to assure satisfactory web formation. The relative amount of jet degeneration can be quite accurately controlled by adjustment of position and the speed of rotation of the flow control member or by either of these procedures, and through this means, the desired operating conditions can be established within the web-forming region.

Under most operating conditions, the pressure differential across the wire in the web-forming region should be at a minimum in the upstream portion of the web-forming region, and should increase in the direction of movement of the wire, this principle having been set forth in my prior applications above referred to. At the same time, the stock must be supplied to the flow control mechanism at sufficient pressure to obtain a jet at the proper velocity relative to wire speed and sufficient pressure in the flow control chamber to accomplish adequate flow through the web-forming member in the web-forming region.

The subsequent controlled degeneration of the jet within the flow control chamber results in the conversion of a substantial and controlled amount of the velocity energy in the jet, particularly the energy in the upper peripheral portion or boundary layer of the jet, into pressure energy, and it is by this means that the increased pressure in the direction of movement of the wire in the web-forming region is accomplished. At the same time, a part of the upper portion of the jet stream which passes into the flow control chamber is being continuously conducted away from the web-forming region by the recirculation action and by flow out of the web-forming region on top of the formed web. Also, a predetermined part of the lower portion of the jet stream will, under most operating conditions, be conducted out of the flow control chamber backwardly along the wire.

When so operated, the arrangement results in the delivery to the web-forming region on the wire of only the central or core portion of the jet. Since the relative dimensions of the flow control mechanism and the web-forming region are such that the core of the jet persists substantially intact through at least a substantial part of the web-forming region, this means that the velocity of the stock reaching the wire can be maintained approximately equal to the wire speed, despite the fact that the pressure in increasing in the directioin of movement of the wire as a result of the change of the velocity energy in part of the jet into pressure energy.

In this latter connection, it is important to note that there may be conditions wherein it is not desirable to increase the pressure in the direction of wire movement. Also, under certain conditions, it may not be desirable or possible to maintain the velocity of the stock being delivered to the wire at, or approximately at, wire speed.

In effect, the main stream of stock passing into the flow control unit, which stream, as previously stated, is of generally rectangular cross-sectional outline, is divided into at least three divisions or layers. Each division constitutes a portion of the main stream having the same width transversely of the machine as the main stream, and the three divisions are thus disposed layerwise in side-by-side relationship in the direction of movement of the forming member. The central division passes directly through the flow control chamber into contact with the wire or other web-forming member. The upstream division is caused to flow backwardly along the wire or other forming member as that member moves into the web-forming region, and the third or downstream division, at least part of which mingles with the recirculating vorticular stream, is conducted away from the web-forming region, a part being recirculated within the flow control unit and a part passing out of that unit on top of the formed web.

It will be evident that this mode of operation will inherently result in the continuous carrying away from the web-forming region of the upstream and downstream boundary or surface layers of the main stream of stock passing into and through the flow control unit. In other words, the upper and lower boundary layers which are necessarily affected most by frictional contact with the defining surfaces of the conduit through which they pass and by the jet degeneration action are continuously removed from the web-forming region, with resultant important improvement in the hydraulic characteristics of the stream division reaching the web-forming region on the forming member.

The amount of stock which is spouted out of the flow control chamber on top of the formed web which is supported on the wire is capable of substantial variation, depending upon the operating conditions desired and the type of paper which is to be manufactured. In the manufacture of the lighter weight sheets, for example, sheets up to about 12 to 18 pounds for 480 sheets, 24 x 36 inches, it is practical to form the entire sheet on a quite limited section of the wire, having for example, a length in the direction of wire movement within the range of from 2 to perhaps 6 inches.

In the manufacture of heavier weight sheets, it is possible, in apparatus of the type herein disclosed, to accomplish a part of the formation under atmospheric conditions by the use of stock which is spouted out onto the formed web from beneath the slice. It should be noted that this is an important departure from the prior teachings, since it has heretofore been considered impractical to form any part of a heavier weight sheet under pressure forming conditions.

Operation of the apparatus in instances where the web is formed partially under pressure forming conditions and partially under atmospheric conditions imposes some limitations on the flexibility of the apparatus. Particularly, it is necessary to limit the maximum pressure existing within the flow control chamber in the region of the slice mechanism to a value which is not materially greater than the pressure required to produce a spouting velocity at the slice equal to wire velocity. Pressures in excess of or materially less than this value will tend to produce derangement of the web as it passes beneath the slice lip. It will be evident that the restrictions thus imposed on the pressure within the flow control chamber also restrict the pressure at which stock may be delivered to the flow control mechanism, and the amount of throttling which can be accomplished in producing the jet stream.

If a pressure differential across the web-forming region greater than that which will result from the maximum allowable pressure within the flow control chamber is desired, it will generally be necessary to use some type of reduced pressure means beneath the wire.

When the web is formed in part externally of the pressure unit, various auxiliary means such as suction boxes, forming tables or the like will probably be found advantageous in order to increase the rate of flow through the wire. It is also possible and practical to include arrangements of this type which extend beneath the pressure forming region itself. Thus, the web-forming region on the wire may include a section of the wire which is entirely supported on the breast roll or a section which is partially supported on the breast roll and is otherwise unsupported, or a section which is partially supported on the breast roll and a section partially supported upon other means, such as a forming table or suction box. Other variations and combinations will be evident and certain examples of these arrangements will be described hereinafter.

When the web is being formed substantially entirely under pressure forming conditions, quite some variation in the pressure within the flow control mechanism is possible. However, in instances where a substantial portion of the web, i. e. above perhaps 5 to 8%, is to be formed externally of the pressure unit, it will generally be necessary to maintain the pressure in that region quite close to a pressure equivalent to a spouting velocity equal to the wire speed.

In the control and adjustment of the operating conditions of papermaking machines of the general type illustrated in Figures 2 and 3, the most important available controls are the pressure at which the stock is delivered to the inlet side of the flow control unit 47, the throttling effect which is accomplished by the transverse throttling member 141, the relative speed of the vorticular recirculating flow which exists within the main flow control chamber 125, the position of the slice, and the dimensions of the web-forming region on the wire.

Adjustment of the throttling member 141 determines the pressure and velocity at which the jet of stock is introduced into the flow control chamber 125 of the flow control unit. By control of the velocity at which the jet is introduced into the flow control chamber, it becomes possible to control, over a rather wide range, the machine direction to cross machine direction strength ratio, as previously described. To a certain extent, this adjustment also affects the rate of recirculation in the vorticular stream which exists within the flow control chamber, since the throttling of the stock inflow produces a region of low pressure transversely across the machine in the region of the flow control chamber which is forward of the throttling member 141, which low pressure induces, and to a considerable extent regulates, the recirculation flow.

Major control of the recirculating, vorticular flow is accomplished, however, by control of the position and/or speed of rotation of the flow control member which is located within the main flow control chamber. When a driven roll, such as the roll 127, is used as the flow control member, it is possible by suitable variation in the speed of this roll to determine with reasonable exactness the pressure pattern in the web-forming region. In general, increased speeds of the flow control roll 127 will tend to minimize the pressure in the flow control chamber 125 in the region where the upper surface of the jet meets the peripheral surface of the vorticular stream, and simultaneously, to increase the pressure downstream of that region. Reducing the speed of the roll will tend to minimize the increase of pressure along the wire in the web-forming region, in the direction of wire movement. The substitution of a roll having a solid shell will also change the pressure–velocity pattern.

The physical dimensions of the web-forming region, specifically its length in the direction of wire movement, can be adjusted by longitudinal movement of the upper section 87 of the flow control unit 47, and to some extent by adjustment of the apron plate 109.

The axis of the jet entering the flow control unit should be substantially parallel to the surface of the wire in the web-forming region. The minimum possible ratio of machine direction to cross machine direction strength will be realized when the velocity of the jet is approximately equal to the wire velocity, and increased machine direction to cross-direction strength ratios will be produced when the velocity of the jet is greater or less than the wire velocity. The pressure of the jet may vary within quite wide limits, depending on the type of pressure pattern required, the speed of formation, and also upon whether or not any formation at atmospheric pressure will occur later downstream of the slice.

In general, best results are obtained in the operation of papermaking equipment as described by the use of stock suspensions of lower consistency than has heretofore been considered practical in pressure forming mechanisms. To illustrate, papers of the tissue type, i. e. sheets having a basis weight up to about 15 pounds for 480 sheets, 24 x 36 inches, have been manufactured in the past from stock having a consistency within the range of from about .18 to .35 per cent, and heavier weight papers, such as for example, book papers having a basis weight within the range of 15 to 30 pounds and upward for 480 sheets, 24 x 36 inches having been manufactured from stock having a consistency within the range of from about .5 per cent to 1.3 per cent. In apparatus in accordance with the invention, stock consistencies within the range of from about .05 to .25 can be used in the manufacture of tissue papers at speeds within the range of from 500 to 3000 feet per minute, with the preferred range being from about .18 to .25 per cent. In the manufacture of book papers in the weight range stated, the preferred range consistency would be about .15 to .25, with an overall range of about .07 to .40 per cent.

In accomplishing the most satisfactory web formation and overall stability of operation under certain operating conditions, and especially during very high speed operation, it is desirable, as above noted, that a portion of the flowing stream of stock delivered to the web-forming region shall flow backwardly along the moving wire, through the passageway 113 existing between the under surface of the apron plate lip 111 and the wire. When the jet velocities existing within the flow control unit are high, i. e. 1500–2000 feet per minute or above, certain instability conditions which are inherent in pressure forming type machines tend to appear, and these instabilities can be avoided by the creation of a stable, backwardly flowing stream of stock which passes out of the flow control chamber in the region where the wire enters that chamber. As disclosed in my prior application, Serial No. 121,525, this backwardly flowing stream stabilizes the flow at the upstream portion of the web-forming region and effects the creation of a line of stagnation points transversely across the machine in the region above and rearward of the apron lip.

When operating under conditions which involve relatively low wire speeds and low jet velocities, this tendency to instability is substantially reduced and under such conditions, it may not be necessary to provide the backwardly flowing stream of stock. The provision of the backwardly flowing stream of stock at the upstream end of the web-forming region has, however, an important further advantage over and above instability control in that it removes from the web-forming region the lower boundary layer of the stream or jet which is flowing into the flow control chamber. Since there is some degeneration of the jet in this region, removal of that layer accomplishes the very desirable result of assuring that only the central or core portion of the jet reaches the upstream edge of the web-forming region. This materially facilitates the adjustment of the flow velocity in the wire forming region.

When the backwardly flowing stream exists, the amount of stock which is discharged in that manner may constitute a substantial portion of the total stock delivered to the flow control chamber. For example, amounts up to 40 or even 50% of the total flow have been used in arrangements such as that disclosed in my prior application Ser. No. 121,525. However, in most flow control units for high speed operation, wherein the stock is delivered to the web-forming region as a high energy jet having a velocity approximately equal to the wire velocity, it will rarely be found necessary to institute back flow in excess of about 10 per cent of the total flow into the flow control unit. In most instances, where boundary layer removal only is the primary consideration, back flow in the amount of 2–5 per cent will usually be adequate.

The amount of stock which is recirculated within the flow control chamber, in order to produce the vorticular stream which intermixes with the upper layer of the jet, will vary, depending upon the position of the flow control member (and its speed of rotation, if a rotating roll is used), the relative dimensions of the flow control member and the flow control chamber, and the particular ratio of machine direction to cross machine direction strength which is to be accomplished. In the manufacture of tissue weight sheets at speeds within the range of 500 to 3000 feet per minute, by the use of machines of the type illustrated in Figures 2 and 3, and by the use of stock having a consistency within the range of .05 to .18 per cent, satisfactory operation has been attained where the amount of recirculating flow was within the range of from 20 to 30 percent of the total flow into the flow control unit. In the manufacture of heavier weight papers, for example, book grades having basis weights within the range of 15 to 30 pounds or heavier, for 480 sheets, 24 x 36 inches, recirculation in amount equal to 20 to 40 per cent of the total flow into the web-forming unit have been used with good results.

The amount of stock which flows out of the flow control chamber on top of the formed web is controlled by the positioning of the slice lip or other means defining the downstream edge of the pressure forming region. Under all conditions of operation, it is advisable to so position the slice lip that there will be a sufficient amount of stock on the wire as it passes beneath the slice lip to effect lubrication of the web and prevent its derangement. Generally, the discharge with the formed web of an amount of stock equal to from about 5 to 8 per cent of the total amount delivered to the flow control unit to effect formation of the web will accomplish satisfactory lubrication of the formed web. In instances where a portion of the web is to be formed downstream of the pressure forming region, i. e. in instances where a portion of the web is formed at atmospheric pressure, the adjustment of the slice lip will be such that substantially greater amounts of stock will flow out of the flow control chamber on top of the wire.

When the amount of stock which is discharged from the flow control chamber beneath the slice exceeds that which is necessary to effect lubrication of the formed web, it is important that this stock shall be spouted out of the flow control chamber at a velocity which is approximately equal to the wire velocity. When the amount is merely that required for lubrication purposes, somewhat less careful adjustment of this velocity is required.

The exact velocity of flow of the layer of stock which is discharged with the web is very difficult to determine, due to the fact that considerable shear is present at the slice lip and in the decreasing area or other passageway through which the web and the stock layer reach the slice lip. As a result, the portion of the layer of stock immediately adjacent the slice surface has approximately zero velocity, whereas the portion or lamina directly overlying and contacting the web is necessarily at wire velocity. Hence, when referring to the "velocity" at which the layer of stock is discharged with the web, what is meant is the average velocity existing in that layer, and it is that average velocity which should be approximately equal to wire velocity.

The slice mechanism accomplishes the important function of conducting the formed web out of the web-forming region without disturbing or deranging the web fibers. This involves the accomplishment of a transition action during which the pressure existing in the formed web must be reduced from the pressure existing in the web-forming region within the flow control mechanism to atmospheric pressure.

In the construction illustrated in Figures 2 and 3, this transition is accomplished by the decreasing area in the flow passageway 173 provided between the wire 11 and the flexible plate section 161 of the slice mechanism. It will be understood that other slice or discharge lip constructions may be used and may have particular advantages in certain instances.

For the purposes of this application, the web-forming region may be defined as that region wherein the concentration and deposition of those fibers which ultimately constitute the formed web is actually taking place. Alternatively, the web-forming region may be defined as that region wherein there is substantial flow through the web-forming member of the white water or other fluid carrier for the fiber.

Under ordinary operating conditions of the apparatus illustrated in Figures 2 and 3, where the amount of stock discharged beneath the slice lip is merely sufficient to lubricate the web, almost all of the fiber deposition and flow of white water through the wire will occur in the region included between radial lines drawn from the center of the breast roll 13 to the downstream edge of the apron plate lip 111 and to the slice lip 163, which region might also be described as the region of pressure forming. There may be some deposition of fibers from the backwardly flowing stream of stock which is discharged through the passageway 113, although this is usually of rather small magnitude. Also, in instances where a substantial amount of stock is discharged from the flow control chamber 125 beneath the slice lip 163, and onto the upper surface of the partially formed web, there will be substantial fiber deposition downstream of the slice lip.

When paper making apparatus of the type illustrated in Figures 2 and 3 is to be placed into operation, the fore and aft positioning of the upper section 87 of the flow control unit 47, which determines the location and dimensions of the web-forming region, the pressure at which stock is delivered to the flow control unit, the positioning of the throttling member 141, the apron lip and the slice structure 131, and the speed of rotation of the flow control member 127 will usually be based upon the approximate calculated position of those elements. Generally, the first adjustment to be made will be of the throttling member 141 to assure the attainment of the desired jet velocity and recirculation within the flow control chamber. By the use of pressure or velocity taps in the side walls 93 of the upper section 87 of the flow control unit, as indicated at 187 and 189 in Figure 3, or in other of the defining surfaces of the flow control chamber indicated generally at 192, it becomes possible to ascertain immediately following the admission of stock to the flow control unit whether or not the projected operating conditions are being attained. Other means of measuring the flow are possible and have proven practical. For example, electrical flow measuring mechanisms which employ a heated search unit are available; these units may be placed in contact with flowing streams of fluid and calibrated to read flow directly.

The next adjustment to be accomplished will probably be that of the speed of rotation of the flow control roll 127. This adjustment may conveniently be based upon examination of the sheet being manufactured. Adjustment of the slice may also be made to assure that the formed web is passing out of the flow control chamber without derangement. Some fore and aft adjustment of the relative position of the breast roll may also be found desirable, particularly at the start-up. Inspection of the formed web will be relied upon to a considerable degree for determining the optimum position of the various control units.

One of the more important functions accomplished by the flow control element is the stabilization of the vorticular flow which is used in accomplishing the controlled degeneration of the jet of stock which is introduced into the flow control chamber. When the flow control element constitutes a driven roll, the flow control element accomplishes the additional function of providing quite flexible control of the pressure along the web-forming region. In instances where this flexibility of pressure control may not be required, it is possible to use a stationary flow control member, which member may be cylindrical in form, and is preferably supported in such manner that its position within the flow control chamber can be adjusted. An embodiment of the invention utilizing such a flow control element is illustrated in Figures 4 to 7, and except for the flow control unit and its support and adjusting means, the structure shown in these figures is similar to the arrangement illustrated and described in Figures 2 and 3.

Figure 4:
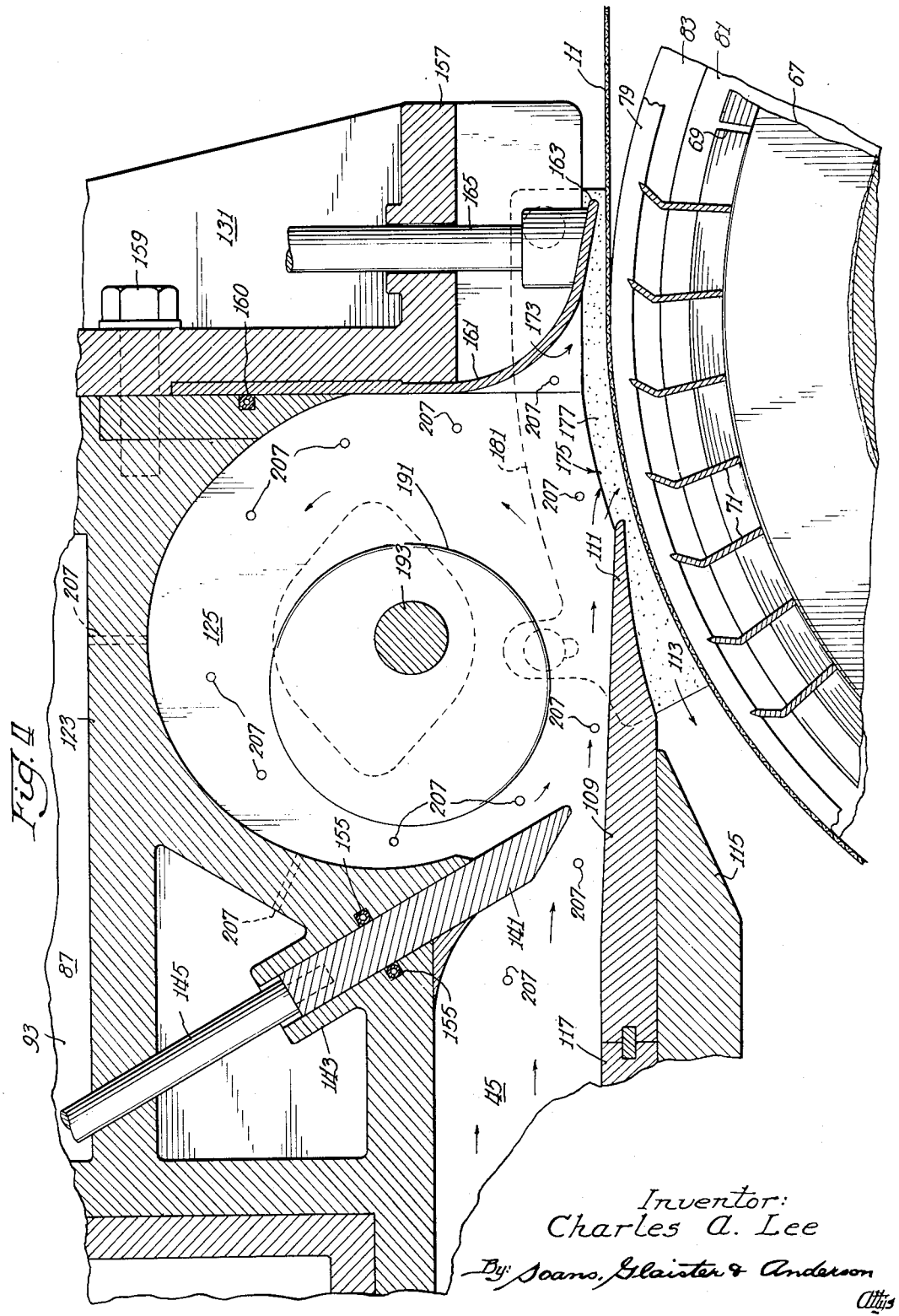
Figure 4 is an enlarged, fragmentary, sectional view, similar to Figure 3, illustrating the flow control mechanism and the web-forming region of a modified structure in accordance with the invention.

Referring particularly to Figure 4, it will be seen that the flow control element 191 comprises a smooth-surfaced, solid, cylindrical member having a diameter which is somewhat greater than one-half the diameter of the flow control chamber 125, wherein it is located. The axis of the flow control member extends substantially parallel to the axis of the flow control chamber, and it is intended that the position of the flow control element 191 can be adjusted over a rather substantial range of positions during operation of the machine.

To accomplish this adjustment, the flow control element 191 is provided with a pair of cylindrical shaft sections 193, which extend from either end thereof, and which are disposed eccentrically with relation to the axis of the flow control element 191. The shaft sections 193 are supported upon the side walls 93 of the upper section 87 of the flow control unit by means which includes an eccentrically bored, adjusting member 195, having a cylindrical outer surface which fits within a cylindrical guide and support member 197 bolted to the side wall 93, as shown particularly in Figure 7. The outer end of each of the shaft sections 193 is keyed to an adjusting nut and index member 199, whereby the flow control element 191 can be rotated within the flow control chamber. A similar indexing element 201 is attached to the element 195 for effecting rotation of that member. By this means, it is possible by relative rotation of the shaft section 193 and the support members 195, to adjust the position to the flow control element 191 within the flow control chamber 125. The apparatus includes means for locking the flow control element 191 in any selected position, and also indicating scales 203 for aiding in a ready determination by the operator of the position of the flow control element. The flow control element 191 is locked in any selected position by means of a pressure element 205, which bears against the indexing members 199 and 201. The apparatus may also include suitable indexing or indicating means for providing a visual indication of the position of the throttling member.

Figure 5:
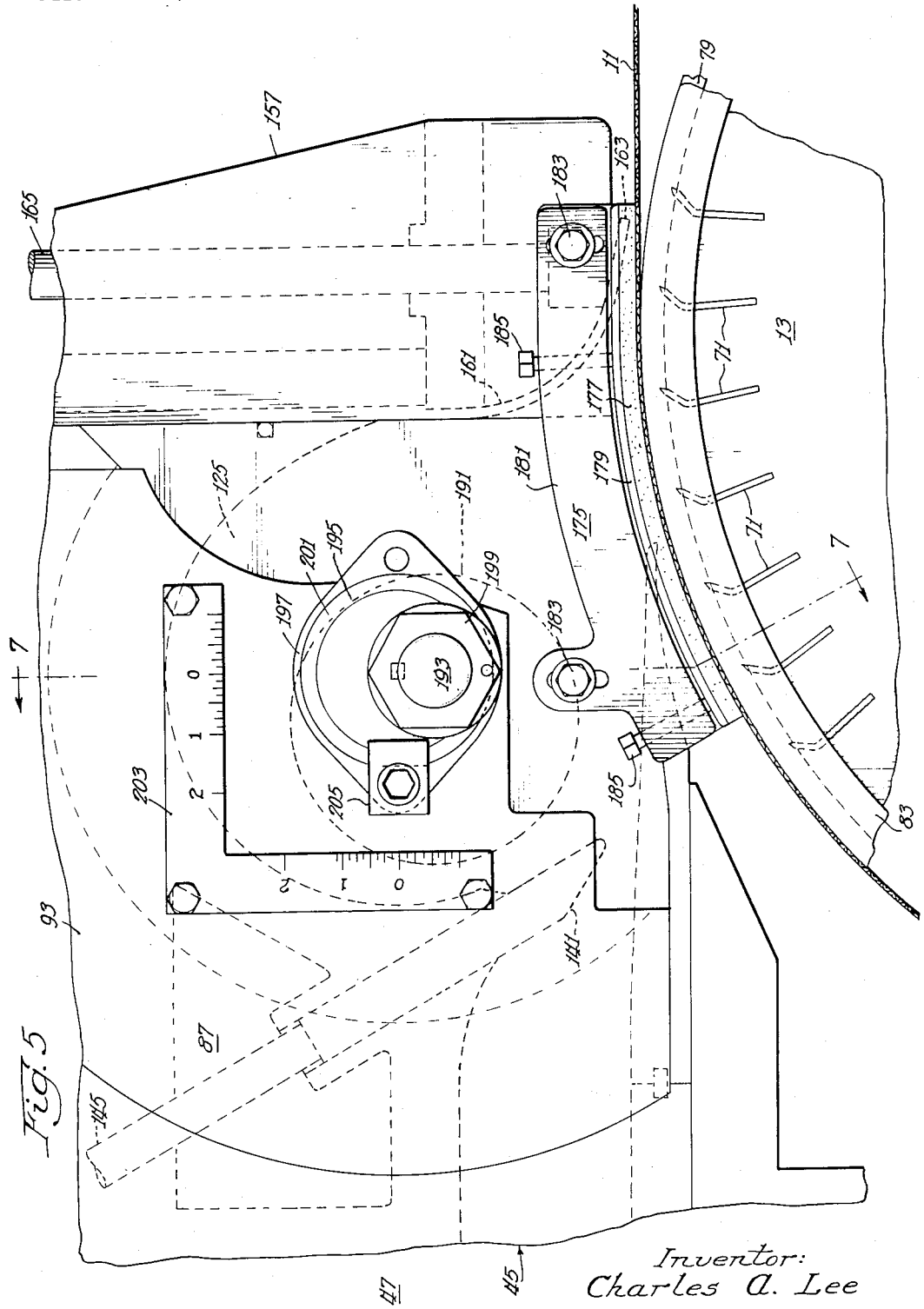
Figure 5 is a side elevational view, drawn to the same scale as Figure 4, illustrating certain of the details of the flow control mechanism and the adjustable control means for the flow control mechanism illustrated in Figure 4.
Figure 6:
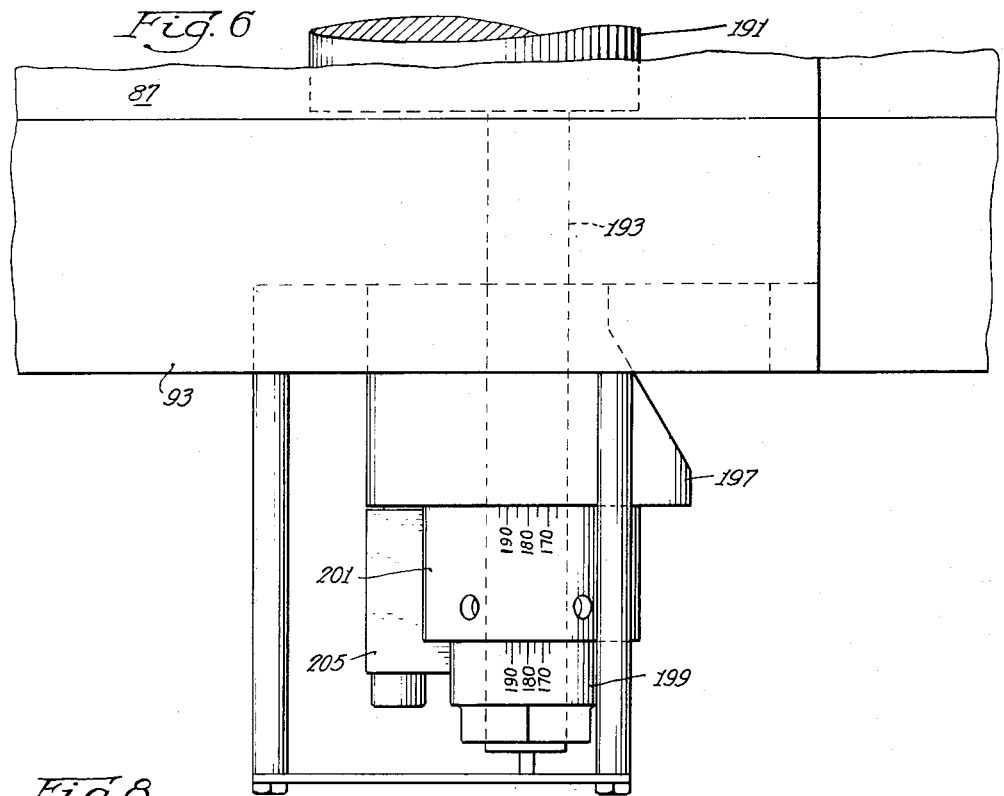
Figure 6 is a plan view of the adjusting means constituting a part of the mechanism shown in elevation in Figure 5.
Figure 8:
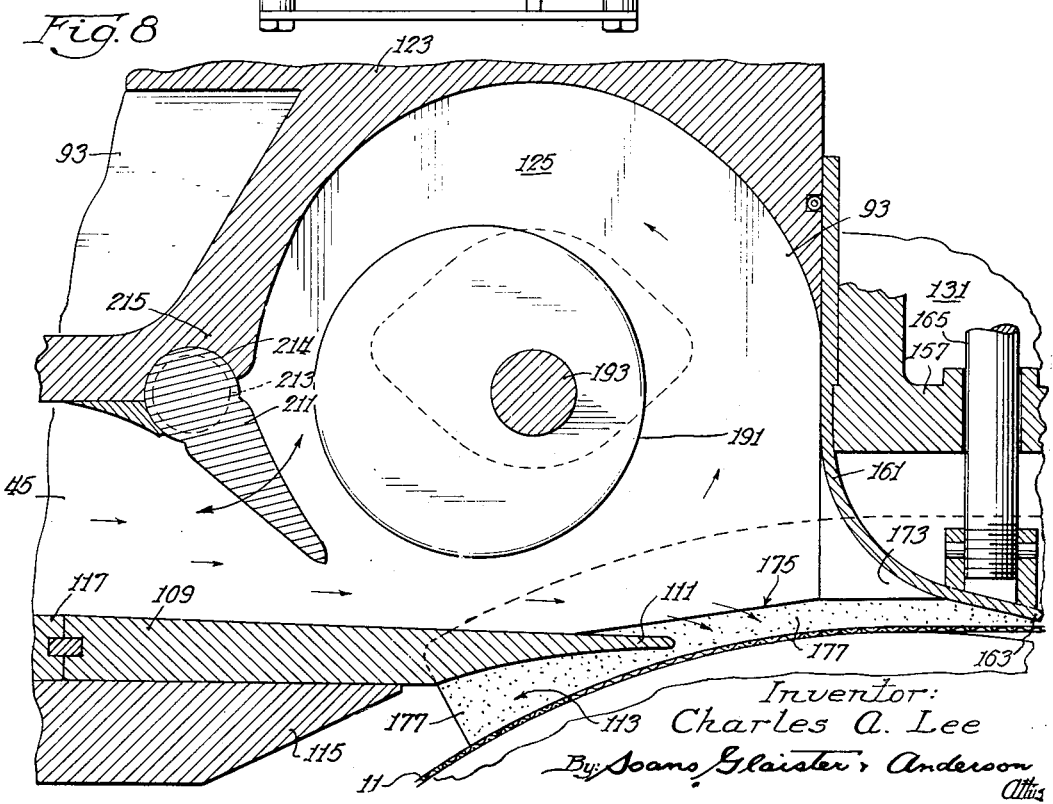
Figure 8 is a sectional view, generally similar to Figures 3 and 4, illustrating certain of the features of another adjustable throttling control mechanism in accordance with the invention.

The operation and mode of control of the flow control mechanism illustrated in Figures 4 to 7 is essentially the same as the operation and mode of control of the apparatus illustrated in Figures 2 and 3. Stock is introduced into the flow control chamber beneath the adjustable throttling member 141, and a high energy jet is produced, as in the Figure 3 arrangement. Also, as in the prior arrangement, controlled degeneration of the upper portion of this jet is accomplished by diffusing or intermixing that portion of the jet into the periphery of a vorticular stream produced by recirculation of the stock contained within the flow control chamber. Adjustment of the recirculation and the degeneration of the jet is accomplished by adjustment of the position of the flow control element 191. In one desirable operating condition, a non-rotating flow control element, such as is illustrated at 191, having a diameter of 5 inches, was installed in an 8 inch diameter chamber. The flow control element was positioned about 1 inch above the surface of the apron plate 109 and about ¾ inch from the surface of the throttling member 141 (211 in Figure 8), as illustrated in Figures 4, 5 and 8. While the control effected by a stationary element of this type is not as complete as can be effected by a driven element, it is sufficient to produce very important operational improvement in apparatus wherein it is embodied.

The cylindrical flow control member should have a diameter at least about one-half the diameter of the flow control chamber wherein it is used, in order to realize its maximum effectiveness in stabilizing the vorticular circulation within the flow control chamber and in regulating the degeneration of the jet, which results primarily from the difference in velocity of the jet and the peripheral velocity of the circulating, vorticular stream. As previously noted, the jet should be established near, but not in, the web-forming region.

In operations where vortex instability may not be a serious problem, for example, in the operation of narrow width machines, or in the manufacture of coarse grades of paper, the flow control element may sometimes be omitted. In such instances, the jet alone will establish a circulating vorticular stream and some degree of control will be possible by adjustment of the throttling member, illustrated in Figures 3, 4 and 8.

To aid in accomplishing control of the degeneration of the jet, and also to facilitate the control and adjustment of the formation, it is desirable that the apparatus include pressure and velocity taps, as indicated generally at 207 in the side walls 93 of the flow control unit and the defining walls of the flow control chamber 125. These taps, coupled with observations of the characteristics of the formed sheet, make possible a continuous examination of the conditions existing within the web-forming region, and substantially facilitate control of the mechanism.

In the previously described embodiments of the invention, the throttling means which is provided at the inflow side of the flow control chamber constitutes a transversely-extending member 141 which is movable in a generally straight line direction to effect control of the throttling effect. It is practical to use a hinged member for this purpose, similar, for example, to the hinged vane member illustrated in my prior application Serial No. 242,519, and a flow control mechanism which includes such a throttling member is illustrated in Figure 8; otherwise, the mechanism is similar to the structure shown in Figures 4 to 7. The throttling member shown in Figure 8 constitutes a transversely-extending vane element 211, which is provided with a stub shaft section 213 at either end thereof, and with an arcuate upper section 214 which fits within a suitable cooperating portion 215 of the wall defining means 123 for the flow control chamber 125 and the inflow conduit 45. The shaft sections 213 extend through the side walls 93 of the unit and are adapted to be engaged by suitable means, not shown, for positioning the vane member 211 and for locking it in position. The apparatus may also include position indicating mechanism. The type of throttling control effected by a member such as the vane 211 is essentially similar to that produced by a rectilinearly movable element, as in the previously described arrangements.

It is also possible, under certain conditions, to utilize a stationary throttling member which might be similar in form to either of the adjustable vane structures described, except for the omission of the adjusting mechanism. A stationary throttling element removes one of the most important control and adjustment mechanisms of the apparatus, but under stabilized operating conditions, such as the manufacture of a standardized product at uniform speed, the added flexibility of an adjustable throttling mechanism may not be necessary.

Both of the previously described embodiments include a curved vane, open type breast roll as part of the mechanism. It should be understood that this is merely an illustrative arrangement, since the invention can be used in conjunction with open breast rolls of other types, and within limits, the invention also has application to the manufacture of paper and other webs on web-forming members which are not supported on a breast roll in the web-forming region, or which may be supported on a solid breast roll upstream of the web-forming region. For example, it is possible to use breast rolls which include vacuum chambers or other means for aiding in controlling the pressure differential existing across the web-forming member during the forming operation, and an example of such an arrangement is illustrated at 13a in Figure 9.

The flow control mechanism 87 of the structure illustrated in Figure 9 is substantially the same as the structure shown in Figures 2 and 3, and similar reference characters have been applied to the corresponding structural elements. The breast roll 13a includes a plurality of suction box units which are normally operated to provide reduced pressure below portions of the web-forming region, although they can be operated to provide positive pressure, if that should be desired.

The open type breast roll illustrated at 13a in Figure 9 includes a perforated outer shell 217, which is supported by suitable bearing means, not shown, for rotation in proper operating position relative to the wire 11 and the flow control unit 47. The periphery of the shell 217 is provided with a plurality of slots 219, extending axially of the roll, and these slots receive and support rectangularly-shaped bar or vane members 221. The bar members 221 are slotted at closely spaced intervals to receive a helically wound ribbon 223, which constitutes the actual support means for the forming wire 11. The helically wound ribbon 223 may be generally similar in dimensions and spacing to the ribbon 79 of the previously described embodiment. In any event, the dimensions of this ribbon and its spacing are such that the wire is adequately supported with minimum interference or obstruction of flow therethrough in the web-forming region. Also, as in the previously described structure, the helical winding 223 desirably projects above the edges of the vane members 221, so as to permit fluid circulation between the cellular spaces created between the vane members.

In the operation of open surfaced rolls of the type disclosed, it will generally be found desirable that the volume of the cellular spaces provided in the periphery of the roll shall be greater than the volume of liquid which is to be received in those spaces, and it is also desirable that there shall be free communication between the spaces.

Internally of the roll shell, there are provided a plurality of suction box units, as illustrated at 225 and 227. The suction box units are separated from each other and the wall defining means therefor is provided with sealing means, such as the strips 229, which are adapted to ride against the inner surface of the roll shell 217. During operation of the apparatus, a predetermined, reduced pressure can be maintained within each of these units, and this pressure will be available to reduce the pressure which is required within the flow control chamber 125 in order to maintain the desired pressure differential across the web-forming member within the web-forming region.

The operation of this mechanism and the roll 13a is similar to the operation of the previously described embodiments. The white water which flows through that portion of the web-forming member which is supported on the open breast roll, passes into the cellular spaces provided in the periphery of the roll. This flow is controlled in part by the pressure which is maintained within the suction box units, and it is intended that the white water shall be held in the roll only for a period of time sufficient to permit removal of that fluid from the web-forming region. Where the white water is discharged is not too important, although it is generally convenient to discharge the white water into a tray or other means located between the reaches of the wire. When the web-forming region includes an unsupported section of the wire of substantial length, as in the illustrated arrangement, a considerable portion of the flow will pass through that portion of the wire and will not at any time enter the roll periphery.

It will be noted by reference to Figure 9 that the slice structure 131 includes a curved surface element or nose 231, which extends transversely across the machine immediately above the entrance to the discharge passageway 173, through which the formed web is conducted out of the flow control chamber 125. The upstream surface 233 of the nose section 231, which is generally cylindrical in form, merges smoothly into the defining surfaces of the flow control chamber, and into the adjacent surface of the slice plate 161. The presence of the curved surface 233 in the region where the flow within the flow control chamber 125 divides, one portion recirculating within that chamber to provide the vorticular stream which is used in the control of the jet, another portion passing out of the flow control chamber with the web, and still another portion moving into contact with and through the web-forming member, will be found of great value in stabilizing the flow conditions in this region. Particularly, this surface facilitates the development of a line of stagnation points extending transversely across the machine in the region where the recirculating flow separates from the remainder of the stream, and by virtue of the geometry of the arrangement, this line of stagnation points and the flow around it tend to remain quite stable during operation.

Operation and adjustment of the mechanism illustrated in Figure 9 is generally similar to the operation and adjustment of the previously described embodiments of the invention. The availability of the suction box units 225 and 227 constituting a part of the breast roll structure provides an additional control feature which will be found advantageous under certain operating conditions. To produce a "square" sheet, the stock should be introduced into the flow control chamber 125 with an average velocity cross-sectionally of the jet which is approximately equal to the wire velocity. The jet, which has a rectangular cross-sectional outline, is established a short distance upstream of the web-forming region. The axis of the jet should extend generally parallel to the plane of the wire in the web-forming region, and the magnitude of the pressure existing in the jet should approximate the pressure necessary to produce a spouting velocity beneath the slice plate 161 approximately equal to wire velocity.

In this connection, it will be understood that the flow reaching the slice, in position to be discharged from the flow control chamber on top of the formed web, will have a residual velocity, as a result of its having been jetted into the flow control chamber in the first instance. Hence, the pressure necessary to produce a spouting velocity beneath the slice lip approximately equal to wire speed is not the pressure required to produce a spouting velocity equal to wire speed from a relatively quiescent body of fluid, such as might be contained in a headbox, but rather a lesser value, which is determined by the actual energy relationship in the slice region.

The rate of degeneration of the jet, which is controlled by adjustment of the recirculating, vorticular stream will be adjusted to provide the desired pressure differential across the wire in the web-forming region. The relative machine direction to cross direction strength can be varied by increasing the jet velocity to a value above the wire speed, or decreasing it to a value below the wire speed. The jet velocity and pressure can be adjusted by control of the pressure at which the stock is supplied to the flow control element or by adjustment of the throttling mechanism, or both.

The embodiments of the invention previously described are particularly adapted to the manufacture of relatively light weight papers, i. e. papers having a basis weight of not over about 20 pounds per standard ream of 480 sheets 24 x 36 inches on a bone dry basis. As previously pointed out, one of the very important features of the present invention is the discovery that it is possible by use of the procedures herein disclosed to manufacture, under pressure-forming conditions and at very high speeds, sheets of a much heavier basis weight than 20 pounds per standard ream. An apparatus for accomplishing this is illustrated in Figure 10.

In order to manufacture these heavier weight sheets under pressure forming conditions at high speed, it has been found that it is necessary to provide a web-forming region of substantially increased length as compared with the web-forming regions used in the manufacture of light-weight sheets, and in addition, it appears very important that the wire or other web-forming member shall be supported in this region by means especially designated to aid in promoting rapid flow of the white water or other carrier fluid through that member. A rather careful correlation of the various factors of pressure and velocity and the relative relationship of the pressure and velocity components is also involved.

The dimensions of the jet should be such that at least the core of the jet will persist throughout the web-forming region, this in order to obviate the existence of more than the desired difference in velocity between the jet and the wire. This means that the vertical, cross-sectional height of the jet at the inflow end of the flow control chamber must be at least $\frac{1}{16}$ the total length of the web-forming region in the pressure forming zone, and preferably the vertical height of the jet should not be less than about $\frac{1}{12}$ of the length of the web-forming region, these values being based on the assumption that the jet is established a reasonably close proximity to the upstream edge of the web-forming region.

Also, it is very difficult to accomplish the controlled degeneration of the jet in a web-forming region of the length which is required in the manufacture of the heavier weight sheets by the use of either a single driven roll or a stationary cylindrical member of circular cross-section, primarily for the reason that the area in which control is accomplished by such members does not extend over a sufficient length of the web-forming region. This difficulty can be avoided by the use of a flow control chamber and a flow control member of such shape that the recirculating stream does not follow a cylindrical path, but rather an elongated O-shaped or oval path, whereby the stabilization of flow and the control of the jet degeneration can be accomplished over the full extent of the web-forming region.

Apparatus embodying an elongated flow control chamber and an elongated flow control member is illustrated in Figure 10. This structure includes a flow control unit 47a having a lower section 49a which is exactly similar to the lower section 49 previously described and an upper section 87a, which is similar to the previously described unit 87, except in regard to the slice structure 131a and the flow control mechanism located intermediate the slice 131a and the throttling member 141 at the inflow side of that mechanism. The throttling mechanism is similar to that shown in Figures 3, 4 and 9, and bears the same reference characters.

The flow control chamber 234 is defined by a series of fabricated plate and reinforcing sections 236 and 237 which extend transversely of the machine and are connected to the side walls 93 of the upper flow control section 87a. The flow control chamber 235 is generally oval in cross-section, with the major cross-sectional axis of the oval being inclined downwardly in the direction of wire movement. The flow control member 239 located within the flow control chamber 235 of the illustrated structure is also oval in cross-section, and is positioned centrally of that chamber, so as to provide a flow passageway for the recirculating stream of stock of substantially uniform cross-sectional area.

In contrast with the previously described arrangements, where the web-forming region includes a section of the wire which is supported on the breast roll, and a section of the wire, usually of somewhat shorter length, which is not supported on the breast roll, the web-forming region in the Figure 10 arrangement has its major length downstream of the line along which the wire leaves the surface of the breast roll. Further, the structure includes a fluid-permeable support means for at least that portion of the wire in the web-forming region which is subjected to the pressure existing at the outflow of the flow control chamber. In the illustrated structure, this support means includes a box-like member 241 which extends transversely of the machine and is closed on all sides except for the upper surface, which is provided with a foraminous wall means 243 arranged to support the wire. The side wall 245 at the upstream side of the support member 241 is curved, in order that the upper edge of that member may extend into close proximity to the line of departure of the wire from the breast roll 13b. Also, to facilitate the carrying away of white water from the portion of the web-forming region which overlies the breast roll, and the subsequent discharge of that white water from the breast roll, it is desirable that the passageway 247 between the upstream, defining surface of the side wall 245 of the wire support member 241 and the surface of the breast roll shall be of increasing area in the direction of movement of the breast roll, as illustrated.

The foraminous upper surface of the stationary, wire supporting member 241 may be perforated, or more desirably, it may be provided with a series of inclined, transversely-extending vane members 249 which are spaced apart, so as to provide longitudinal slots 251 extending transversely of the machine, and which are adapted to bear against the undersurface of the wire. The vanes 249 may be supported in any convenient manner as, for example, by the use of vertically-extending supports, such as are indicated generally at 253. The dimensions of the slots 251 provided between the vane members should be such that there is adequate space for the flow which will pass therethrough during the operation of the machine. The interior of the box-like wire support member may be connected to a source of reduced pressure (not shown), such as are used with suction boxes, whereby the pressure on the under side of the wire may be further controlled.

The slice structure 131a illustrated in Figure 10 differs somewhat from the slice arrangements previously described. It will be understood, however, that this is merely illustrative, and that slice structures of the type shown in connection with the previously described embodiments may be used, and that the arrangement shown in Figure 10 may be used in conjunction with the other embodiments.

The slice structure 131a includes a transversely-extending beam member 255 which is bolted or otherwise rigidly attached to a transversely-extending bar or plate member 257, which constitutes the end portion of the frame structure of the upper section 87a of the flow control unit. Also affixed to the transversely-extending frame member 257 is a second transversely-extending structural element 259, which serves as the main support for an adjustable slice plate 261.

The structural elements 257 and 259 are machined to provide a flat support surface for the slice plate 261, which surface extends transversely across the machine at an angle of approximately 45° to the horizontal. The slice plate 261 is adapted to be held against this surface by means of suitable screw fastenings 263 and a coacting guide plate 265. The screw fastenings 263 extend through enlarged openings 267 in the slice plate 261, and spaced adjusting screws 269 are provided transversely across the machine, in order that the slice plate can be moved relative to its support means. The adjusting screws 269 bear against a transversely-extending member 271, which engages the beam 255 through a slot and key connection and which is bolted directly to the member 259.

The edge surface 273 of the slice plate 261 which is initially contacted by the flowing stream of stock within the flow control unit is arcuate and may constitute a section of a right circular cylinder. This is done in order that the flow within the flow control chamber 235 will divide in the region of this edge surface, so as to provide a line of stagnation points which extend transversely across the machine in accordance with the operational principles of the invention. During normal operation, this line of stagnation points will be substantially at the mid point of the surface 273 and, hence, will be nearer the forming wire 11 than the adjacent surface of the flow control member 239.

The contour and dimensions of the slice surface 275 which overlies the forming wire 11 in the region downstream of the arcuate edge surface 273 have, as in the previously described structure, an important effect on the operation of the apparatus. In order that the formed web may be carried out of the web-forming region, without derangement or damage to the web, the surface 275 preferably comprises a flat, inclined surface which is inclined downwardly toward the adjacent surface of the forming wire, so as to define with that surface a flow passageway 277 of substantial length and of constantly decreasing cross-sectional area. The lip of the slice plate 261 is defined in the illustrated structure by a vertically-extending edge surface 279, which merges into the inclined surface 275, as shown.

In order that the slice plate 261 may be adjusted in a vertical direction, the construction includes one or more spacer plates 278, and it will be evident that any reasonable vertical adjustment of the slice plate can be accomplished by the use of a suitably dimensioned spacer plate or plates. Other adjustment is, of course, possible, by movement of the breast roll and the support member 241.

The upper surface of the slice plate 261 and the exposed surfaces 281 of the spacer plate or plates 278 merge smoothly into each other and into the adjacent defining surfaces of the flow control chamber 235, as illustrated. The structure includes edge seals 283 and 285, which may be similar to the seals previously described. The open-surfaced breast roll 13b may be similar to the breast roll 13 or 13a or it may be of other suitable type. Also, the breast roll may be used with or without suction boxes.

The Figure 10 apparatus is desirably provided with suitable pressure and velocity taps, as indicated generally at 289 in order to facilitate operation and control of the mechanism. It is also desirable that the flow control member 239 shall be adjustably positioned within the flow control chamber 235; this may be accomplished by the use of threaded stud supports 287, arranged to extend through suitable, enlarged openings in the side walls 93, or to eccentrically engage rotatable plate sections, not shown, in the side walls 93.

When the apparatus is placed into operation, the throttling member 141 is usually located at a preliminary position which has been previously determined by calculation or experience, based upon the pressure at which the stock is delivered to the inflow side of the flow control chamber and the pressure which is to exist in that chamber. If a "square" sheet is to be manufactured, the adjustment of the throttling member 141 should be such that the jet produced at the inflow opening of the flow control chamber will have a velocity approximately equal to the wire velocity. If a "square" sheet is not desired, the velocity of the jet will be either greater or less than wire velocity.

The magnitude of the pressure component of the jet will be related to the wire velocity, the wire flow resistance, the freeness of the stock being used, and the dimensions of the forming area. In other words, the magnitude of the pressure component will be dependent upon the various things which affect and determine the rate of drainage in the web-forming region. When using a slice mechanism of the type illustrated in Figure 10, the formed web may be removed from the pressure forming region with a substantial amount of stock on the top thereof. This requires particular care in correlating the pressure within the flow control chamber with the residual flow velocity in the region of the slice to produce a spouting velocity at the slice which is at least very close to wire velocity. When this condition exists, the web can be removed from the pressure zone to the atmosphere with a substantial amount of stock thereon, and with a minimum of fiber disturbance, and the additional formation can be completed at atmospheric pressure.

The position of the flow control member 239 may be adjusted to accomplish the desired degeneration of the jet and thereby maintain the desired pressure differential across the wire in the web-forming region. This may involve, under certain conditions, the use of a flow control member of somewhat different shape than that shown in Figure 10, although under most operating conditions, an oval shape of the type illustrated can be used satisfactorily. The position of the slice plate 261 can be adjusted to accomplish the proper division of flow and to prevent derangement or disturbance of the formed web. In general, the adjustment and control of the apparatus will follow the previously described arrangements.

Apparatus of the type illustrated in Figure 10 is extremely flexible in its operation, and as previously described, makes possible the manufacture of webs of almost any weight under pressure forming conditions, or combination pressure forming and non-pressure forming conditions. Within limits, the web-forming region in the pressure forming zone may be substantially varied in length, forming lengths of up to 18 inches being well within the practical range, and if the desired formation cannot be accomplished in this region, it is both possible and practical to discharge some stock onto the formed web for drainage downstream of the slice. In formation of this latter type, it is of particular importance that the web shall be removed from the web-forming region with a minimum of disturbance, and a slice structure which provides a passageway of constantly decreasing area and substantial length, with provision for facilitating division of the stream of stock at the inflow end of the exit passageway is of particular importance. The arrangement illustrated in Figure 10 includes both of these features, as do the previously illustrated slice structures, especially the arrangement shown in Figure 9, which includes a nose portion at the upstream edge of the slice for facilitating the creation of a line of stagnation points in the region where the division of flow occurs.

As in the previously described embodiments of the invention, improved results in the manufacture of sheets having a basis weight in excess of 20 pounds per standard ream of 480 sheets 24 x 36 inches will usually be obtained by the use of stock having a somewhat lower consistency than has heretofore been used in the manufacture of such sheets. For example, in the operation of equipment of the type shown in Figure 10, in the production of a sheet of book paper of 22 pounds basis weight, from stock containing 50% bleached sulphite pulp and 50% groundwood pulp, at speeds of 1200–1400 feet per minute, the stock was used at a consistency within the range of from about .20 to .25.

In the manufacture of this sheet, which was entirely formed under pressure forming conditions, the web-forming region was approximately defined by the downstream edge of the apron plate lip 111 and the downstream edge of the slice plate 261. The length of this region was approximately 18 inches. The stock was admitted to the web-forming region as a jet having a velocity of approximating 1320 feet per minute, and a pressure at a point immediately downstream of the throttling member 141 equal to about 20 inches of water. A reduced pressure within the range of from about 2 to 4 inches of mercury was maintained within the wire supporting member 241. The vertical height of the jet, i. e. the distance between the lower edge of the throttling member 141 and the adjacent surface of the apron plate, the dimension A of Figure 10, was approximately 2¼ inches. The slice opening, i. e. the opening between the slice lip and the wire, was within the range of $1/16$ to $3/32$ inch.

Observation showed that fiber in an amount equivalent to that required to produce a formed web having a basis weight of about 16–18 pounds was formed on the wire in the region between the downstream edge of the apron plate 111 and a line immediately upstream of the edge of the wall 245 of the wire support member 241. The additional fiber was deposited in the region downstream of this line, and the white water carrying that fiber to the web was conducted away from the web-forming region through the hollow interior of the wire support member 241. Only a relatively small amount of stock, approximately 6% of the total flow into the web-forming region, was passed out of the web-forming region on top of the formed web.

Adequate control of the degeneration of the jet so as to produce an increasing pressure differential across the wire in the direction of wire movement was accomplished throughout the length of the web-forming region by the vorticular stream produced in the oval flow control chamber 235. Continuation of the wire support member beyond the edge of the slice was found to aid in preventing derangement of the web as it passed beneath the slice lip, and in increasing the drainage rate and hence the permissive speed of the machine.

In the operation of this and the other structural arrangements shown herein, there is a controlled transfer of velocity energy to pressure energy within the web-forming region. It is important that this energy transfer shall take place without abrupt changes in the pressure differential across the web-forming member, and the arrangements shown in Figures 2, 3, 4 and 5 are particularly desirable from this point of view. When applying suction to the under side of the web-forming member, as is possible in the arrangements shown in Figures 9 and 10, the tendency is to establish a more abrupt change in the pressure differential across the web-forming member which sometimes interferes with the forming process. This may be controlled by adjustment of the degree of vacuum applied in the various zones. Further, the presence of a backwardly flowing stream and the effect of the flow control element are most helpful in minimizing the disturbing effects of sudden changes in the pressure differential.

It will be understood, as previously indicated, that substantially increased amounts of stock can be discharged from the pressure-forming region, which region is substantially coincident with the discharge opening in the flow control chamber, onto the top of the web as it passes out of that region. By this arrangement, part of the web-formation (usually a large part) can be caused to take place under pressure forming conditions with the final formation occurring at atmospheric pressure. This greatly extends the operating capacity of the equipment and is an important feature thereof.

In the foregoing, there have been disclosed further extensions and inherent capabilities of various of the principles originally set forth in my co-pending applications. In particular, I have disclosed various of the principles which are determinative of the relationship between machine direction and cross machine direction strength in webs which are manufactured on pressure forming type web-forming mechanisms. The use of these principles to attain any desired relationship between the machine direction and the cross machine direction strength ratio and in the attainment of other formation properties have been set forth at some length.

Additional simple and easily controlled apparatus have been disclosed for accomplishing the control of pressure and velocity relationships existing within the web-forming region of pressure forming mechanisms. These arrangements involve the controlled degeneration of one of the surface portions of a high energy jet, whereby controlled increases and changes in pressure can be accomplished, without substantial change in the velocity of flow in the jet, i. e. in the stream of stock being delivered to the web-forming region. The invention thus adds additional means to the disclosure of my prior applications for accomplishing velocity and pressure control within the web-forming region, and also discloses additional ways in which this control can be used to change or effect the physical properties of the formed sheet.

Procedures and apparatus have been disclosed whereby it is possible to manufacture sheets having a basis weight in excess of 20 pounds per standard ream, in part or entirely, under pressure forming conditions, the invention thus making possible very great permissive increases in the operating speeds of papermaking machinery.

Various of the structural arrangements disclosed are applicable for use in connection with existing equipment, with only relatively minor modifications of that equipment. Moreover, important benefits can be accomplished by the use of only part of the arrangements and procedures disclosed.

Certain of the features of the invention believed to be new are set forth in the appended claims.

I claim:

1. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high velocity stream section which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by mixing into the high velocity portion of said overlying boundary layer, fluid of lower average velocity than the average velocity of the fluid within said high velocity stream section, to thereby effect a predetermined distribution of fluid pressure within the web-forming portion of said flowing stream in the web-forming region, and conducting away from adjacent the downstream end of said web-forming region the portion of said flowing stream which constitutes said overlying boundary layer.

2. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high velocity stream section which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by mixing into the high velocity portion of said overlying boundary layer, fluid of lower average velocity than the average velocity of the fluid within said high velocity stream section, to thereby effect a predetermined distribution of fluid pressure within the web-forming portion of said flowing stream in the web-forming region, and conducting away from adjacent the downstream end of said web-forming region the portion of said flowing stream which constitutes said overlying boundary layer under conditions such that said conducted away portion is recirculated to provide said fluid of lower average velocity.

3. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by mixing into the jet portion of said overlying boundary layer, fluid of lower average velocity than the average velocity of the fluid within said high energy jet, to thereby establish a predetermined increasing fluid pressure distribution within the web-forming portion of said flowing stream in the web-forming region in the direction of movement to the forming member, and conducting away from adjacent the downstream end of said web-forming region the portion of said flowing stream which constitutes said overlying boundary layer under conditions such that said conducted away portion is recirculated to provide said fluid of lower average velocity.

4. In the manufacture of continuous fibrous webs under pressure forming conditions by the use of a confined flowing stream of a fluid suspension of fibrous material which is of generally rectangular cross-sectional outline, having a web-forming portion and at least two other portions which constitute upper and lower boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said upper boundary layer, directing said web-forming portion into said web-forming region, selectively increasing the fluid pressure in the web-forming portion of the flowing stream in the web-forming region by mixing into the jet portion of said upper boundary layer, fluid of lower average velocity than the average velocity of the fluid within said high energy jet, to thereby effect a predetermined distribution of fluid pressure within the web-forming portion of said flowing stream in the web-forming region, and conducting away from the web-forming region said other portions which constitute the upper and lower boundary layers of said flowing stream, the lower boundary layer being removed at the upstream end of said web-forming region and cause to flow backwardly along said forming member and the upper boundary layer being removed adjacent the downstream end of said web-forming region.

5. In the manufacture of continuous fibrous webs under pressure forming conditions by the use of a confined flowing stream of a fluid suspension of fibrous material which is of generally rectangular cross-sectional outline, having a web-forming portion and at least two other portions which constitute upper and lower boundary layers of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said upper boundary layer, directing said web-forming portion into said web-forming region, selectively increasing the fluid pressure in the web-forming portion of the flowing stream in the web-forming region by mixing into the jet portion of said upper boundary layer, fluid of lower average velocity than the average velocity of the fluid within said high energy jet, to thereby establish a predetermined increasing fluid pressure distribution within the web-forming portion of said flowing stream in the web-forming region in the direction of movement of the forming member, and conducting away from the web-forming region said other portions which constitute the upper and lower boundary layers of said flowing stream, the lower boundary layer being removed at the upstream end of said web-forming region and caused to flow backwardly along said forming member and the upper boundary layer being removed adjacent the downstream end of said web-forming region under conditions such that said upper boundary layer portion is recirculated to provide said fluid of lower average energy.

6. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by directing the overlying boundary layer of said stream into a vorticular path and causing a portion of said vorticularly moving fluid to tangentially engage and at least partially intermix with the jet portion of said overlying boundary layer to thereby effect a predetermined distribution of fluid pressure within the web-forming portion of said flowing stream in the web-forming region.

7. In the manufacture of continuous fibrous webs under pressure forming conditions by the use of a confined flowing stream of a fluid suspension of fibrous material which is of generally rectangular cross-sectional outline, having a web-forming portion and at least one other portion which overlies the web-forming portion and constitutes a boundary layer of said flowing stream, said web-forming portion being caused to flow into contact with a moving, fluid-permeable forming member in a web-forming region in such manner that the longitudinal axis of said web-forming portion extends in a direction generally parallel to the direction of movement of said forming member, as said forming member passes through the web-forming region, the improvement which comprises producing a high energy jet which includes said web-forming portion and a portion adjacent said web-forming portion which constitutes a part of said overlying boundary layer, directing said web-forming portion into said web-forming region, selectively increasing the fluid pressure in the web-forming portion of the flowing stream in the web-forming region by directing the overlying boundary layer of said flowing stream into a vorticular path and causing a portion of said vorticularly moving fluid to tangentially engage and at least partially intermix with the jet portion of said overlying boundary layer adjacent the web-forming region to thereby cause a progressive degeneration of a portion of said jet and establish a predetermined increasing fluid pressure distribution within the web-forming portion of said flowing stream in the web-forming region.

8. In web-forming apparatus of the pressure forming type, a continuous web-forming member, means for supporting said member and for moving said member through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a transversely extending flow control member disposed within said chamber so as to provide a re-entrant passageway within said chamber, and a transversely extending throttling member disposed adjacent the inflow opening of said flow control chamber which is operable to cause the flowing stream of fluid which flows into said flow control chamber to enter said chamber in a form of a high energy jet, the axis of which jet extends generally parallel to the surface of the forming member in the web-forming region and means adjacent the downstream end of said web-forming region for causing a portion of the fluid within the flow control chamber to flow through the said re-entrant passageway to produce a circulatory stream of fluid which intermixes with said jet above said web-forming region to thereby establish a predetermined distribution of fluid pressure within the jet in the web-forming region adjacent the forming member.

9. Apparatus as defined in claim 8, wherein said flow control chamber is cylindrically shaped with the major axis thereof extending transversely to the direction of movement of said web-forming member, and wherein said flow control member is a cylindrical member disposed with its major axis extending parallel to the major axis of said flow control chamber.

10. Apparatus as defined in claim 8, which includes a slice at the downstream edge of said outflow opening, the lower edge of said slice being spaced vertically from said forming member an amount sufficient to provide an opening through which a portion of said stream of fluid is spouted out of said flow control chamber onto the web-forming member.

11. In web-forming apparatus of the pressure forming type, a continuous web-forming member, means for supporting said member and for moving said member through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, an elongated, cylindrically shaped flow control member disposed in a generally central position within said chamber so as to provide a re-entrant passageway within said chamber, a transversely extending throttling member disposed adjacent the inflow opening of said flow control chamber which is operable to cause the flowing stream of fluid which flows into said flow control chamber to enter said chamber in a form of a high energy jet, the axis of which jet extends generally parallel to the surface of the forming member in the web-forming region and means adjacent the downstream end of said web-forming region for causing a portion of the fluid within the flow control chamber to flow through the said re-entrant passageway to produce a circulatory stream of fluid which intermixes with said jet above said web-forming region to thereby establish a predetermined distribution of fluid pressure within the jet in the web-forming region adjacent the forming member, and the downstream edge of said outflow opening having an inclined edge portion which defines with the forming member a passageway of decreasing cross-sectional area in the direction of movement of the forming member through which the web which is laid down on the forming member passes out of said flow control unit.

12. In web-forming apparatus of the pressure forming type, a continuous web-forming member, means for supporting said member and for moving said member through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, an elongated, cylindrically shaped, flow control rotor disposed within said chamber so as to provide a re-entrant passageway within said chamber, and a transversely extending throttling member disposed adjacent the inflow opening of said flow control chamber which is operable to cause the flowing stream of fluid which flows into said flow control chamber to enter said chamber in a form of a high energy jet, the axis of which jet extends generally parallel to the surface of the wire in the web-forming region, and drive means operable to rotate said rotor at a speed sufficient to cause a portion of the fluid at the downstream end of said web-forming region to flow through the said re-entrant passageway to produce a circulatory stream of fluid which intermixes with said jet above said web-forming region to thereby establish a predetermined distribution of fluid pressure within the jet in the web-forming region adjacent the forming member.

13. In web-forming apparatus of the pressure forming type, a continuous web-forming member, means for supporting said member and for moving said member through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at, and being substantially coextensive with, the outflow opening of said flow control unit, said flow control unit including means defining the walls of a flow control chamber which is closed except for said inflow and said outflow openings, and through which the fluid delivered to said web-forming region is caused to flow, an adjustable transversely extending, flow control member disposed in a generally central position within said chamber so as to provide a re-entrant passageway within said chamber, and an adjustable, transversely extending throttling member disposed adjacent the inflow opening of said flow control chamber which is operable to cause the flowing stream of fluid which flows into said flow control chamber to enter said chamber in a form of a high energy jet, the axis of which jet extends generally parallel to the surface of the wire in the web-forming region and means adjacent the downstream end of said web-forming region for causing a portion of the fluid within the flow control chamber to flow through the said re-entrant passageway to produce a circulatory stream of fluid which intermixes with said jet above said web-forming region to thereby establish a predetermined distribution of fluid pressure within the jet in the web-forming region adjacent the forming member.

14. In web-forming apparatus of the pressure forming type, a continuous web-forming member, a breast roll supporting said member for movement into and through the web-forming region of said apparatus, a source of supply of a fluid suspension of a fibrous material and a flow control unit having an inflow opening connected to said source of supply and having an outflow opening through which a confined flowing stream of said fluid is discharged onto said forming member under pressure forming conditions as that member is moved through said web-forming region, said web-forming region being located at the outflow opening of said flow control unit, said flow control unit including means defining the walls of a flow control chamber which is closed except for said inflow and said outflow openings, and through which the fluid delivered to said web-forming region is caused to flow, a transversely extending flow control member disposed within said chamber so as to provide a re-entrant passageway within said chamber, and a transversely extending throttling member disposed adjacent the inflow opening of said flow control chamber which is operable to cause the flowing stream of fluid which flows into said flow control chamber to enter said chamber in a form of a high energy jet, the axis of which jet extends generally parallel to the surface of the wire in the web-forming region, the upstream edge of said outflow opening being defined by an apron plate and the downstream edge of said outflow opening being defined by a slice plate, said apron plate having a lip on its forward edge which is so positioned relative to said forming member and breast roll that a portion of the flowing stream of fluid which is delivered to said web-forming region will flow, under stable flow conditions, between said lip and said forming member in a direction opposite to the direction of movement of said forming member during operation of said apparatus, and the leading edge portion of the slice plate being of such shape and so positioned relative to the surface of said flow control member that another portion of the flowing stream of fluid which is delivered to the web-forming region is continuously directed away from said web-forming region into said re-entrant passageway under stable flow conditions during the operation of said apparatus, the flow of fluid through said re-entrant passageway producing a circulatory stream of fluid which intermixes with said jet above said web-forming region to thereby establish a predetermined distribution of fluid pressure within the jet in the web-forming region adjacent the forming member.

References Cited in the file of this patent

UNITED STATES PATENTS

| | | |
|---|---|---|
| 838,686 | Case | Dec. 18, 1906 |
| 1,534,080 | Russell | Apr. 21, 1925 |
| 1,890,634 | Wenzel | Dec. 13, 1932 |
| 1,898,372 | Hyde | Feb. 21, 1933 |
| 1,913,678 | Kutter | June 13, 1933 |
| 1,928,286 | Germanson | Sept. 26, 1933 |
| 2,134,408 | Kellett | Oct. 25, 1938 |
| 2,156,445 | Baxter | May 2, 1939 |
| 2,202,890 | Berry | June 4, 1940 |
| 2,281,293 | Lang | Apr. 28, 1942 |
| 2,329,799 | Thorsen | Sept. 21, 1943 |
| 2,384,912 | Helin | Sept. 18, 1945 |
| 2,396,694 | Goodwillie et al. | Mar. 19, 1946 |
| 2,418,600 | Ostertag et al. | Apr. 8, 1947 |
| 2,473,069 | Niks | June 14, 1949 |
| 2,521,261 | Smith et al. | Sept. 5, 1950 |
| 2,608,912 | Davis | Sept. 2, 1952 |

FOREIGN PATENTS

| | | |
|---|---|---|
| 356,294 | Great Britain | Sept. 10, 1931 |
| 539,372 | Germany | Nov. 25, 1931 |
| 153,715 | Austria | July 11, 1938 |